United States Patent
Ramesh et al.

(10) Patent No.: US 11,372,921 B1
(45) Date of Patent: Jun. 28, 2022

(54) ACTIVE DIRECTORY MANAGEMENT AND REMEDIATION

(71) Applicant: ACCENTURE GLOBAL SOLUTIONS LIMITED, Dublin (IE)

(72) Inventors: Avinash Ramesh, London (GB); Alok Panda, Wokingham (GB); Gaurav Tandon, Wokingham (GB); Nick John Samuel Taylor, London (GB); Piyush Jain, Ascot (GB); Om Bhallamudi, London (GB)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/389,120

(22) Filed: Jul. 29, 2021

(51) Int. Cl.
*G06F 16/901* (2019.01)
*G06F 16/28* (2019.01)

(52) U.S. Cl.
CPC ........ *G06F 16/9024* (2019.01); *G06F 16/285* (2019.01)

(58) Field of Classification Search
CPC ............... G06F 16/9024; G06F 16/285; G06F 2221/2141; G06F 21/604; H04L 47/70; H04L 63/10; H04L 63/101; H04L 41/0893; H04L 41/145; H04L 43/045; H04L 43/062; H04L 43/08; H04L 63/1408; H04L 63/1441; H04L 63/20; G06Q 10/0631; G06Q 10/105

USPC .......................................................... 707/740
See application file for complete search history.

(56) References Cited

U.S. PATENT DOCUMENTS

| | | | | |
|---|---|---|---|---|
| 9,537,880 | B1 * | 1/2017 | Jones | H04L 63/1433 |
| 2017/0353483 | A1 * | 12/2017 | Weith | H04L 63/20 |
| 2018/0219888 | A1 * | 8/2018 | Apostolopoulos | H04L 63/1425 |
| 2018/0375886 | A1 * | 12/2018 | Kirti | H04L 63/104 |

* cited by examiner

*Primary Examiner* — Evan Aspinwall
(74) *Attorney, Agent, or Firm* — Mannava & Kang, P.C.

(57) ABSTRACT

In some examples, active directory management and remediation may include obtaining data associated with active directories, and generating, based on the obtained data, a data model that includes a plurality of active directory concepts. A graph may be generated and include the active directory concepts as nodes and relationships between the nodes. The graph may be analyzed to identify user to group memberships. A membership score and a reasoning for the membership score may be determined for each identified user to group membership of the user to group memberships. The membership score and the reasoning for the membership score may be analyzed for each identified user to group membership. Further, based on the analysis of the membership score and the reasoning for the membership score, the at least one of the user to group memberships may be remediated.

19 Claims, 25 Drawing Sheets

1100

GENERATE, BASED ON ANALYSIS OF DATA ASSOCIATED WITH ACTIVE DIRECTORIES, A DATA MODEL THAT INCLUDES A PLURALITY OF ACTIVE DIRECTORY CONCEPTS
1102

GENERATE A GRAPH THAT INCLUDES THE ACTIVE DIRECTORY CONCEPTS AS NODES AND RELATIONSHIPS BETWEEN THE NODES
1104

ANALYZE THE GRAPH TO IDENTIFY USER TO GROUP MEMBERSHIPS
1106

DETERMINE, FOR EACH IDENTIFIED USER TO GROUP MEMBERSHIP OF THE USER TO GROUP MEMBERSHIPS, AT LEAST ONE OF A MEMBERSHIP SCORE OR A REASONING FOR THE MEMBERSHIP SCORE
1108

REMEDIATE, BASED ON AN ANALYSIS, FOR EACH IDENTIFIED USER TO GROUP MEMBERSHIP OF THE USER TO GROUP MEMBERSHIPS, OF THE AT LEAST ONE OF THE MEMBERSHIP SCORE OR THE REASONING FOR THE MEMBERSHIP SCORE, AT LEAST ONE OF THE USER TO GROUP MEMBERSHIPS
1110

*FIG. 11*

ACTIVE DIRECTORY MANAGEMENT AND REMEDIATION

BACKGROUND

An active directory may represent a structure to connect different users with network resources. The active directory may include, for example, a database and a set of services. The active directory may include different types of information related to the users, the network resources, and authorizations associated with the users to perform the services.

BRIEF DESCRIPTION OF DRAWINGS

Features of the present disclosure are illustrated by way of example and not limited in the following figure(s), in which like numerals indicate like elements, in which:

FIG. 11 illustrates a flowchart of an example method for active directory management and remediation in accordance with an example of the present disclosure.

DETAILED DESCRIPTION

Figure 1:
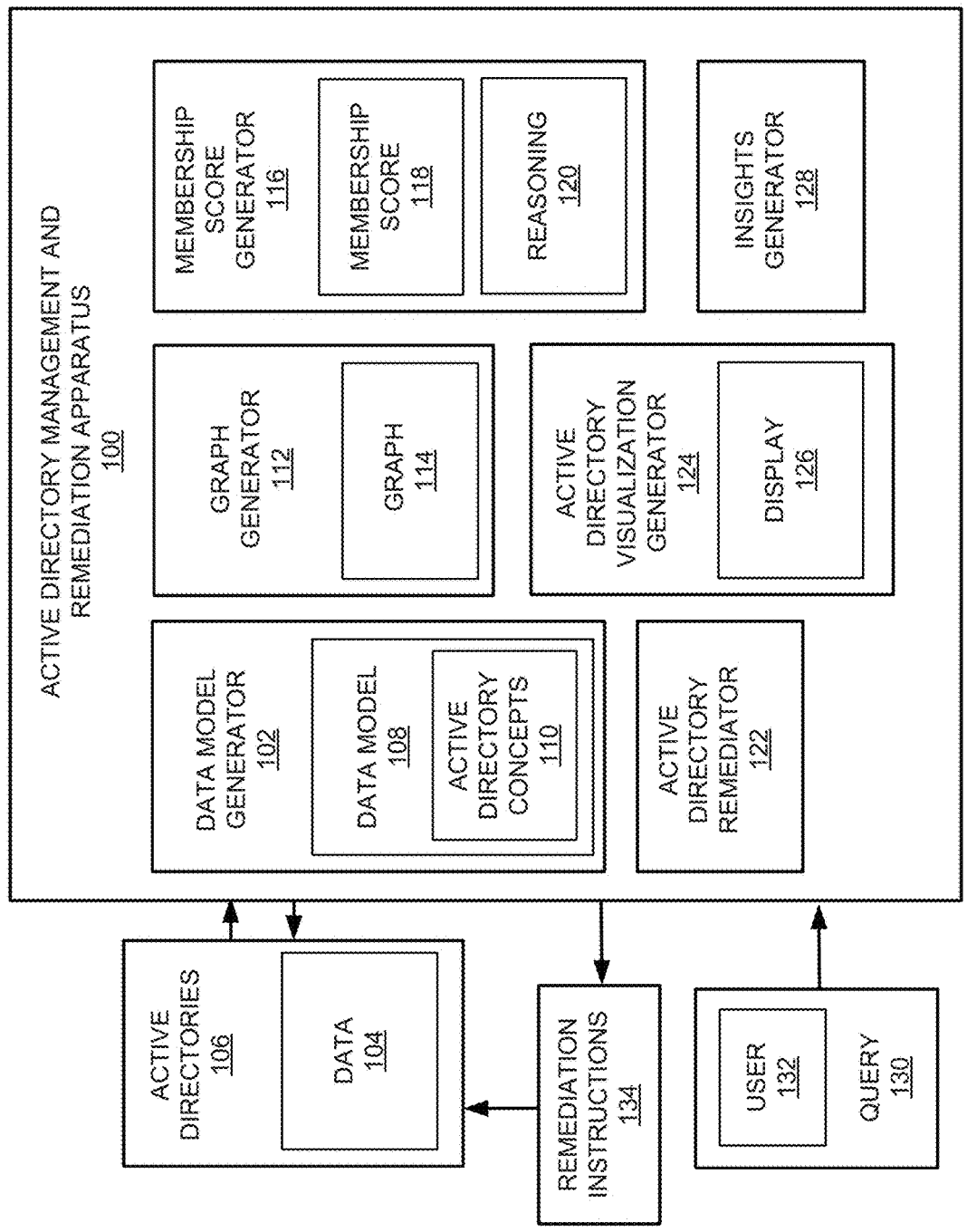
FIG. 1 illustrates a layout of an active directory management and remediation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Active directory management and remediation apparatuses, methods for active directory management and remediation, and non-transitory computer readable media having stored thereon machine readable instructions to provide active directory management and remediation are disclosed herein. The apparatuses, methods, and non-transitory computer readable media disclosed herein provide for accurate and efficient management of active directory groups having nested hierarchies containing any number of levels. In this regard, different users may have different access permissions based on a given level of an active directory, or based on assigned groups in an active directory. An active directory may represent a database and a set of services to connect users. In this regard, the users may be connected with network resources that are needed to perform a task. The active directory may include information about an environment of users, users and computers included in the environment, and permissions associated with the users.

With respect to active directories generally, it is technically challenging to accurately visualize, manage, edit, remediate, and control complex active directory structures. Management, editing, and control may include creation/removal of groups, users, and their attributes, adding or removing users from groups, and/or changing group hierarchies (e.g., creating meaningful hierarchies based on an organization structure). Remediation may include removal of incorrect group grants on users, unnecessary group inheritance, and unexpected access grants on users due to group inheritance. It is also technically challenging to implement a viable active directory group visualization capability, with an interface to provide context and derive insights, for example, for groups, as well as their usage patterns, and relevance to different teams and applications.

The apparatuses, methods, and non-transitory computer readable media disclosed herein may address at least the aforementioned technical challenges by determining which users have direct or indirect access based on assigned active directory groups. Indirect access may be based on group hierarchies (e.g., if a user is assigned a group membership, and that group is nested within other groups, then the user indirectly has access to the nested groups). Thus, the indirect access for a user may represent the superset of all the group hierarchies the user's assigned groups are a part of. According to examples disclosed herein, the apparatuses, methods, and non-transitory computer readable media disclosed herein provide for identification of an owner of a group, level, etc. According to examples disclosed herein, the apparatuses, methods, and non-transitory computer readable media disclosed herein provide for clean-up of active directories by removing unused levels, etc., to ensure that permissions are accurately set for users. Groups may be referred to as unused if they have the following characteristics that include a group is not part of any nesting structure and is empty, or a group is a mid-level in a nesting structure, empty, and does not contain any permission assignments or active directory configuration that affects the nested groups. Users may be identified for remediation based, for example, on a large number of group assignments. For example, if a user has a higher than average or abnormal amount of active directory group assignments, then they may be a target for remediation action. Remediation actions may include a review of the assigned group memberships. According to another example, users may be identified for remediation based, for example, on assignment of low-confidence groups to a user. For example, if a user has a low confidence group assigned, the review process may assess the low confidence group (e.g., its member and group hierarchy). According to examples disclosed herein, the apparatuses, methods, and non-transitory computer readable media disclosed herein provide for automatic (e.g., without human intervention) performance of remediation activities on active directories, such as notifications to target systems, removal of unnecessary access, cleanup of active directory groups and nesting structures, etc. Generally, remediation may refer to removal of unnecessary or inappropriate access permissions granted to a user (e.g., removal of active directory group membership for active directory users, etc.). The active directory groups of users may be targeted for remediation by a "low-confidence" determination based on the scoring cut-off. In this regard, automated (e.g., without user intervention) remediation actions in may include automatic removal of low confidence groups (e.g., modify the source system to remove access grants on user), automated notification to source system or source system owners or maintainers (e.g., suggest to system or system owners or maintainers to remove access grants on user), and automated removal of unused groups, or automatic notification to source system owners or maintainers to clean up unused active directory groups. In this regard, the source system may be active directory or other systems that handle group assignments such as an identity governance or provisioning tools.

According to examples disclosed herein, the apparatuses, methods, and non-transitory computer readable media disclosed herein provide for conservation of computing resources by eliminating unwanted, unused, or invalid entitlements in an active directory. For example, the apparatuses, methods, and non-transitory computer readable media disclosed herein provide for removal of unwanted groups, paths, nesting, etc., in active directory structures. The apparatuses, methods, and non-transitory computer readable media disclosed herein also provide for the addition of security to networks. For example, based on the identification and remediation of instances of accounts that are no longer needed, possible areas of security breaches of a network may be reduced or otherwise eliminated.

According to examples disclosed herein, the apparatuses, methods, and non-transitory computer readable media disclosed herein provide for performance of a data driven discovery, analysis and remediation of active directory group data quality issues including ownership, assignments, permissions, nesting and access creep that may occur with mismanaged group policies and accesses granted to applications. The apparatuses, methods, and non-transitory computer readable media disclosed herein provide for viewing and remediation of active directory security groups. In this regard, the apparatuses, methods, and non-transitory computer readable media disclosed herein may utilize graphs and graph algorithms to determine access patterns and assignment models to provide an end to end view for security analysts, and for remediation of incorrect access grants and over-privileged users. The apparatuses, methods, and non-transitory computer readable media disclosed herein may integrate users, groups, applications, file shares, infrastructure, configuration management database (CMDB) and other data sources.

According to examples disclosed herein, the apparatuses, methods, and non-transitory computer readable media disclosed herein may provide for importation of active directory groups and user memberships.

According to examples disclosed herein, the apparatuses, methods, and non-transitory computer readable media disclosed herein may provide for searching, filtering, and viewing of active directory groups and users.

According to examples disclosed herein, the apparatuses, methods, and non-transitory computer readable media disclosed herein may provide for importation of data from complimentary sources such as, for example, SAILPOINT™, CYBERARK™, and CMDB™.

According to examples disclosed herein, the apparatuses, methods, and non-transitory computer readable media disclosed herein may provide for representation of group and application relationships from complimentary sources.

According to examples disclosed herein, the apparatuses, methods, and non-transitory computer readable media disclosed herein may provide for searching and viewing of group hierarchy and group memberships.

According to examples disclosed herein, the apparatuses, methods, and non-transitory computer readable media disclosed herein may provide for enrichment of active directory group assignments using graph patterns to provide additional context.

According to examples disclosed herein, the apparatuses, methods, and non-transitory computer readable media disclosed herein may provide for inference of usage patterns of active directory groups using graph scoring methods to justify user and group relationships.

According to examples disclosed herein, the apparatuses, methods, and non-transitory computer readable media disclosed herein may provide for management of a relationship between active directory accounts and owners.

According to examples disclosed herein, the apparatuses, methods, and non-transitory computer readable media disclosed herein may provide for management of a relationship between active directory groups and owners.

According to examples disclosed herein, the apparatuses, methods, and non-transitory computer readable media disclosed herein may provide for exportation of enriched group information, for example, to SailPoint IIQ™.

According to examples disclosed herein, the apparatuses, methods, and non-transitory computer readable media disclosed herein may provide for identification to access grants via log analytics.

According to examples disclosed herein, the apparatuses, methods, and non-transitory computer readable media disclosed herein may provide for generation of offline reports.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example active directory management and remediation apparatus (hereinafter also referred to as "apparatus 100").

Referring to FIG. 1, the apparatus 100 may include a data model generator 102 that is executed by at least one hardware processor (e.g., the hardware processor 1002 of FIG. 10, and/or the hardware processor 1204 of FIG. 12) to obtain data 104 associated with active directories 106. The data model generator 102 may generate, based on the obtained data 104, a data model 108 that includes a plurality of active directory concepts 110.

According to examples disclosed herein, the plurality of active directory concepts 110 may include active directory accounts and groups, ownership information for the active directory accounts and groups, membership information for the active directory accounts and groups, nesting information for the active directory accounts and groups, and/or access information for the active directory accounts and groups. Examples of each of these active directory concepts 110 is as follows:

IDENTITY:
   ObjectName: HR_IDENTITY
   ObjectType: node
   Properties:
   city: Austin
   costCenter: ExampleCostcenter
   departmentName: Custom Application Engineering
   displayName: Example, Name
   jobcodeName: Application Development Specialist
      managerName:
      CN=example.manager,OU=People,DC=ds,DC=dev,
DC=example,DC=com
ACCOUNT:
   ObjectName: AD_USER
   ObjectType: node
   Properties:
   user_priviliged: False
   cachedAppAccessCount:0
   cachedGroupMembershipCount:1
   cn: a.a.example
   displayName: Example, Name
      distinguishedName:
      CN=a.a.example,OU=People,DC=ds,DC=dev,
DC=example,DC=com
   email: a.a.example@examplecompany.com
   objectGUID: fe72bdbd-400a-4a7c-9e5d-02c630fbcdc0
   samAccountName: a.a.example
   sapUserID: N2262144
GROUP:
   ObjectName: AD_GROUP
   ObjectType: node
   Properties:
   avgConfidenceScore:0.0
   cachedDepth:0
   cachedDirectMemberCount:43
   cachedSize:43
   cn: abc.groupname_1
   description: This group was auto-generated xyz application
   displayName: abc.groupname_1
      distinguishedName:
   CN=abc.groupname_1,OU=Groups,DC=ds,DC=dev,
DC=example,DC=com
   groupCategory: Security
   groupScope: Global
   groupType:−2147483646
   high:0
   isCriticalSystemObject: False
   low:0
   managedBy:
   medium:0
   objectGUID: 0c32a9e6-917f-47c9-8da1-a8690b20a089
END SYSTEM:
   ObjectName: END_SYSTEM
   ObjectType: node
   Properties:
   systemName: xyz
   systemType: application
MEMBERSHIP:
   ObjectName: MEMBER_OF
   ObjectType: relationship
   from [AD_USER or AD_GROUP] to [AD_GROUP].
   Properties:
   None
CONFIDENCE AND JUSTIFICATION
   ObjectName: MEMBERSHIP_SCORE
   ObjectType: Relationship
   from [HR_IDENTITY] to [AD_GROUP]
   Properties:
   score:77
      reasoning: deparmentName=Custom Application Engineering|managerName:CN=example.manager,OU=People,DC=ds,DC=d ev,DC=example,DC= com According to examples disclosed herein, each node of the nodes and each relationship of the relationships may include a type and a property. With respect to type and property for node and relationship, ACCOUNT nodes may have a property "USER_PRIVILIGED" which stores information on if the user has privileged access on any resources. A MEMBERSHIP_SCORE relationship may have properties SCORE to store the numerical score value and "REASONING" to store a justification string describing the reason behind the scoring.

A graph generator 112 that is executed by at least one hardware processor (e.g., the hardware processor 1002 of FIG. 10, and/or the hardware processor 1204 of FIG. 12) may generate a graph 114 that includes the active directory concepts 110 as nodes and relationships between the nodes.

Figure 2A:
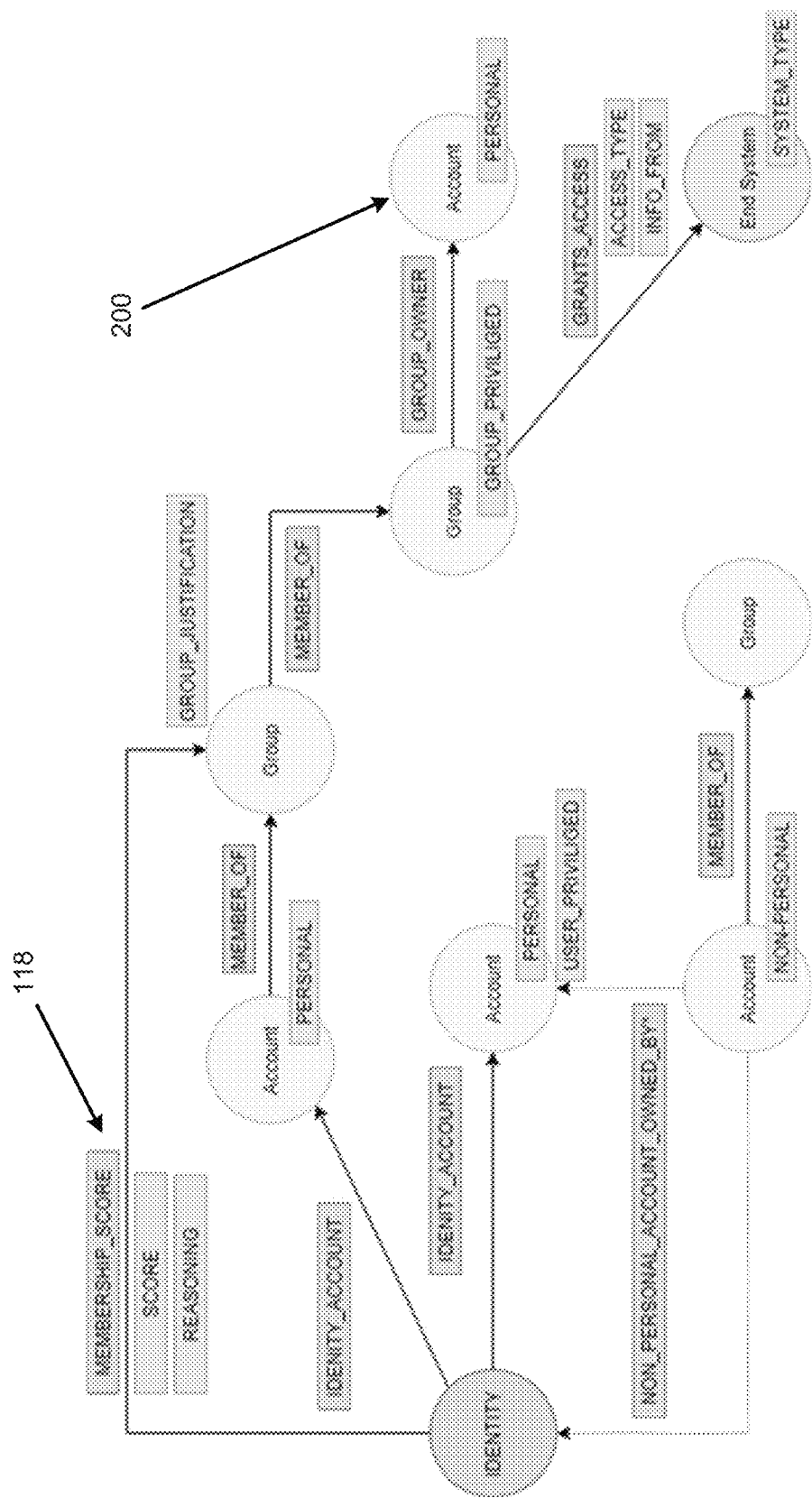
FIG. 2A illustrates a data model to illustrate operation of the active directory management and remediation apparatus of FIG. 1 in accordance with an example of the present disclosure.
Figure 2B:
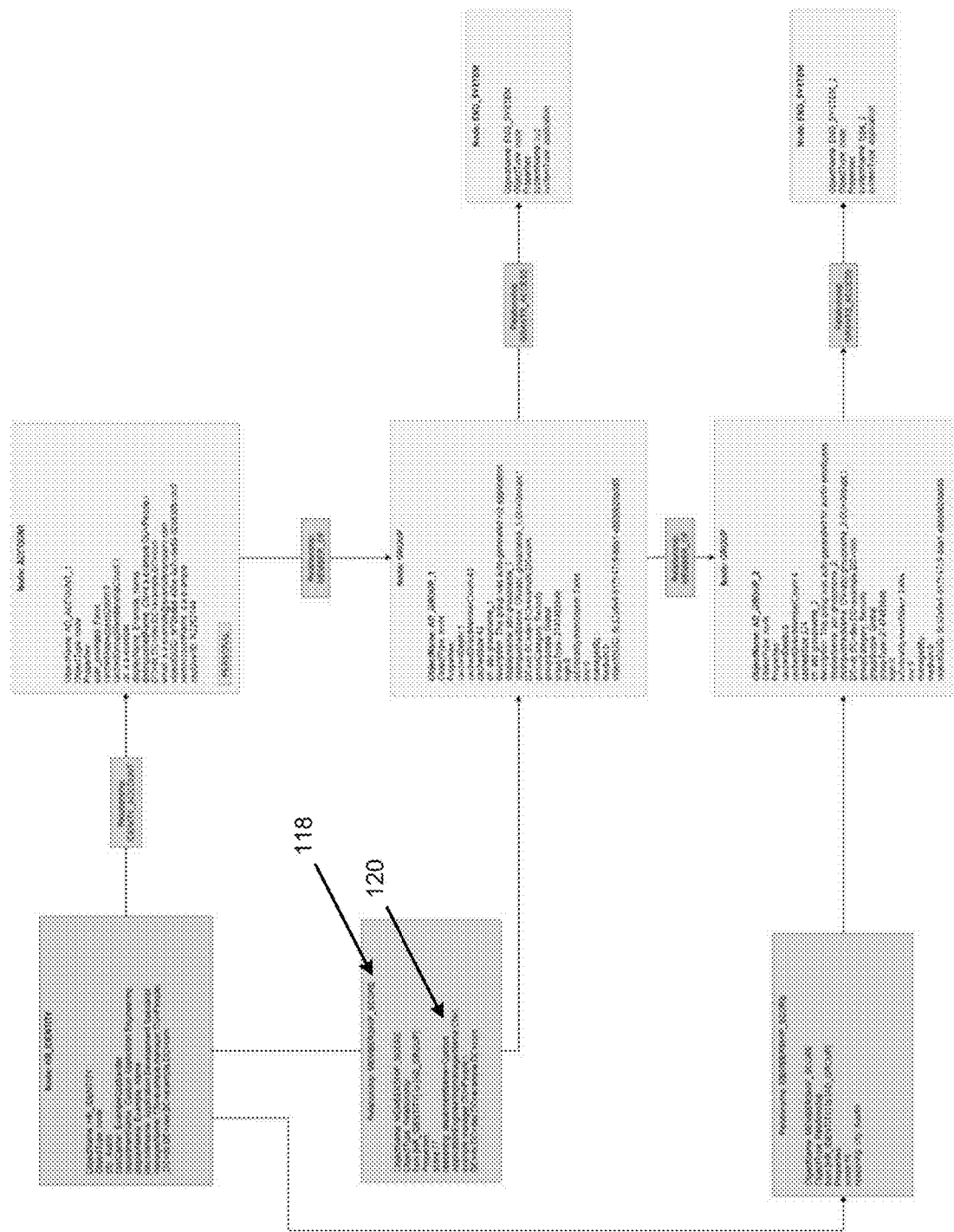
FIG. 2B illustrates user to group memberships to illustrate operation of the active directory management and remediation apparatus of FIG. 1 in accordance with an example of the present disclosure.

A membership score generator 116 that is executed by at least one hardware processor (e.g., the hardware processor 1002 of FIG. 10, and/or the hardware processor 1204 of FIG. 12) may analyze the graph 114 to identify user to group memberships (e.g., see FIG. 2B where user "IDENTITY" has a group membership to group "AD_GROUP_1" and "AD_GROUP_2"). The membership score generator 116 may determine, for each identified user to group membership of the user to group memberships, a membership score 118 (e.g., see FIG. 2B that includes membership score and relationship for each group membership). The membership score generator 116 may determine, for each identified user to group membership of the user to group memberships, a reasoning 120 for the membership score 118 (e.g., see FIG. 2B that includes membership score reasoning for each group membership).

An active directory remediator 122 that is executed by at least one hardware processor (e.g., the hardware processor 1002 of FIG. 10, and/or the hardware processor 1204 of FIG. 12) may analyze, for each identified user to group membership of the user to group memberships, the membership score 118 and the reasoning 120 for the membership score 118. Further, the active directory remediator 122 may remediate, based on the analysis, for each identified user to group membership of the user to group memberships, of the membership score 118 and the reasoning 120 for the membership score 118, at least one of the user to group memberships. For example, as shown in FIG. 2B, the identity has a membership score of 16 for AD_GROUP_2, which can be considered as a low confidence outlier. Considering that the reasoning for this confidence score is city: Austin, while reasoning for AD_GROUP_1 is a stronger reasoning (with department and manager) and higher confidence score, a remediation action may be that AD_GROUP_1 must not be nested into AD_GROUP_2. For example, the active directory remediator 122 may generate remediation instructions 134 to remediate, based on the analysis, for each identified user to group membership of the user to group memberships, of the membership score 118 and the reasoning 120 for the membership score 118, the at least one of the user to group memberships.

With respect to automated remedial actions, such actions may include automatic removal of low confidence groups (e.g., modify the source system to remove access grants on user), automatic notification to source system or source system owners or maintainers (e.g., suggest to system or system owners or maintainers to remove access grants on user), automated removal of unused groups, or automatic notification to source system owners or maintainers to clean up unused Active Directory groups. The source system may include Active Directory or other systems that handle group assignments such as an identity governance or provisioning tool. These automated actions by the active directory remediator 122 may provide technical benefits such as improved security, and reduction in resource utilization with respect to management of Active Directory groups and associated systems that utilize such Active Directory groups. In this example, automated notification to Active Directory system owner or maintainer, or group owner/maintainer of AD_GROUP_1 or AD_GROUP_2 may be needed to request actioning of the remediation item (e.g., removal of group nesting, or evaluation of necessity of the group nesting). The active directory remediator 122 may also evaluate if members of AD_GROUP_1 (e.g., the example IDENTITY) are supposed to have access to END_SYSTEM_2 via AD_GROUP_2.

According to examples disclosed herein, the membership score generator 116 may determine, for each identified user to group membership of the user to group memberships, the membership score 118 that includes a numerical score on a specified scale (e.g., 1-100), and/or a classification as a category of a plurality of categories (e.g., good, ok, bad).

According to examples disclosed herein, the membership score generator 116 may determine, for each identified user to group membership of the user to group memberships, the membership score 118 that includes a numerical score including a confidence for direct or indirect user to group memberships. Confidence calculations may be performed by Autonomous Identity or another confidence calculation tool.

An active directory visualization generator 124 that is executed by at least one hardware processor (e.g., the hardware processor 1002 of FIG. 10, and/or the hardware processor 1204 of FIG. 12) may generate, based on the identified user to group memberships, at least one display 126 of the identified user to group memberships.

According to examples disclosed herein, the active directory visualization generator 124 may generate, based on the identified of the user to group memberships, the at least one display 126 that includes a dashboard display that includes active direct or group information for the active directories. Examples of dashboard displays are shown at FIGS. 5B and 5C. In some examples, dashboard displays may include dashboard metrics (e.g., direct group membership at 504, indirect group membership, etc., and group confidence scores at 506, etc.) generated to display statistics over the entire dataset.

According to examples disclosed herein, the active directory visualization generator 124 may generate the at least one display 126 that includes a group overview display (e.g., see FIGS. 5D and 5E) that includes color cues (e.g., at 508) based on an average confidence score for a group. A group overview may include a search capability where a user can search based on group name or owner name, and filter the search based on number of results, confidence score of the group (e.g., low, medium, high, uncategorized), group size (e.g., minimum and maximum), and nested depth (e.g., minimum and maximum). The search results may be viewed either as a graph or a table, with an option to order the table results (asc or dsc) based on alphabetical ranking (e.g., group name), group size, depth or confidence score. The average confidence score of a group may be determined by taking an average over all the user memberships within.

Figure 5A:
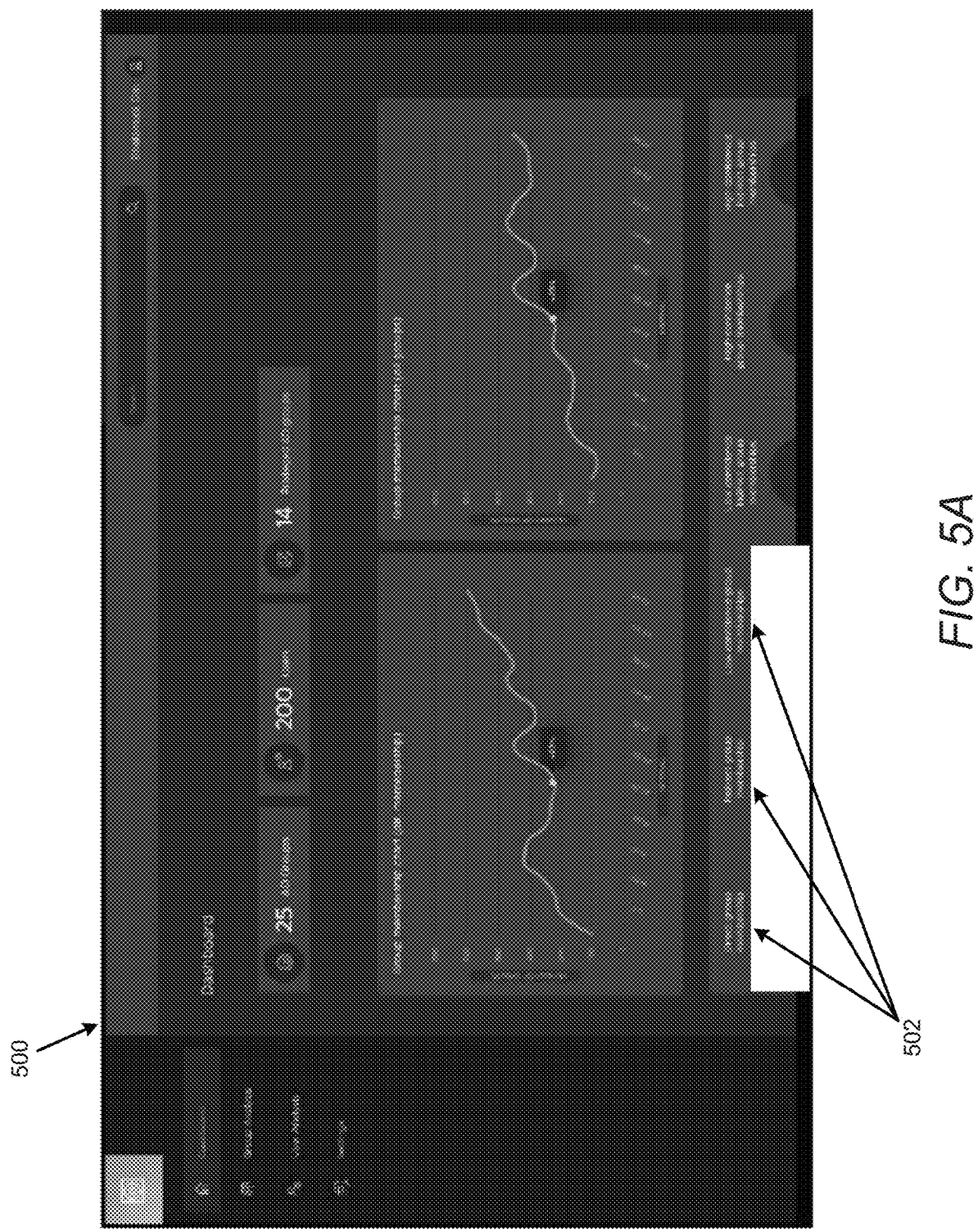
FIG. 5A illustrates a dashboard comprehensive view.
Figure 5B:
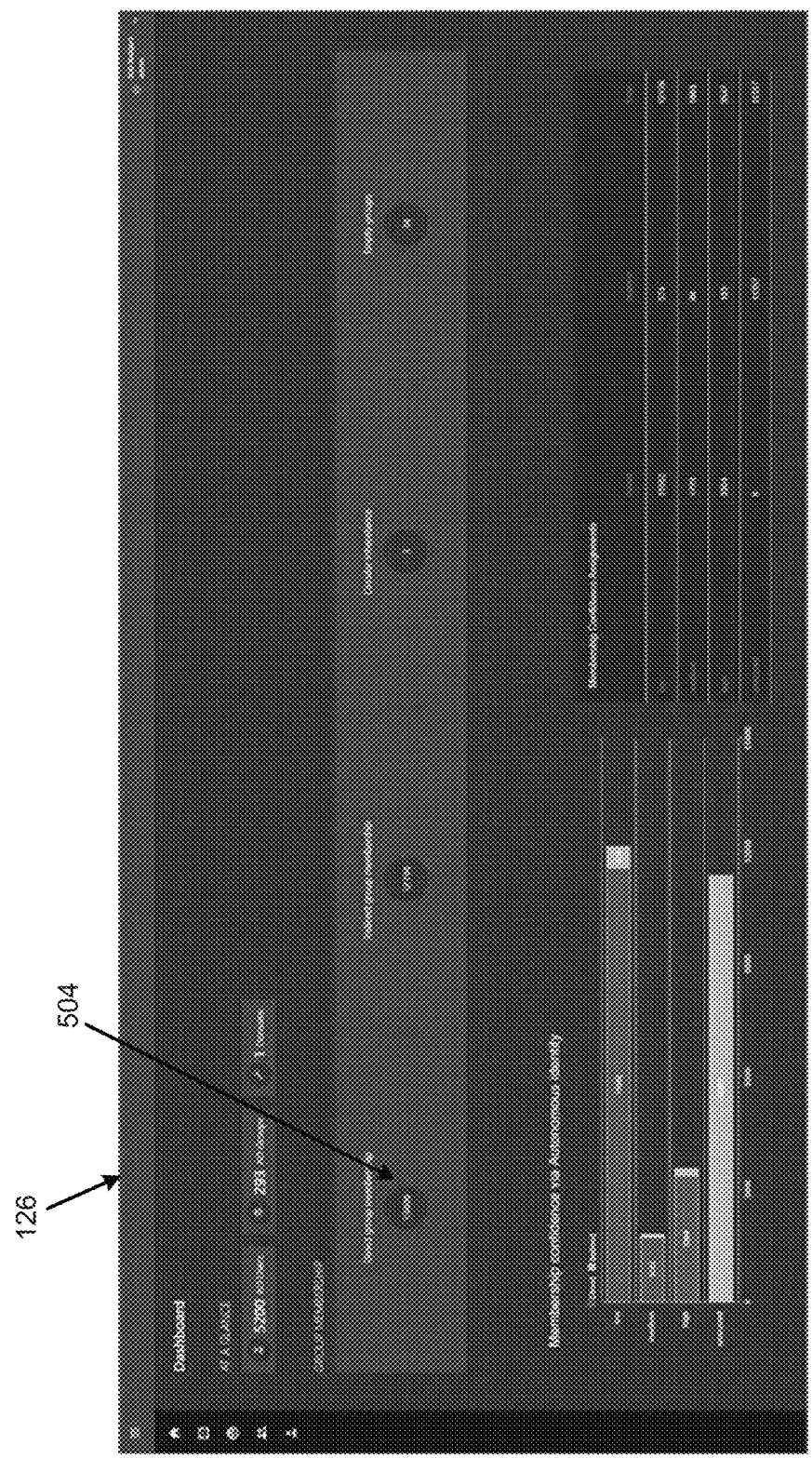
FIGS. 5B and 5C illustrate dashboard displays.
Figure 5C:
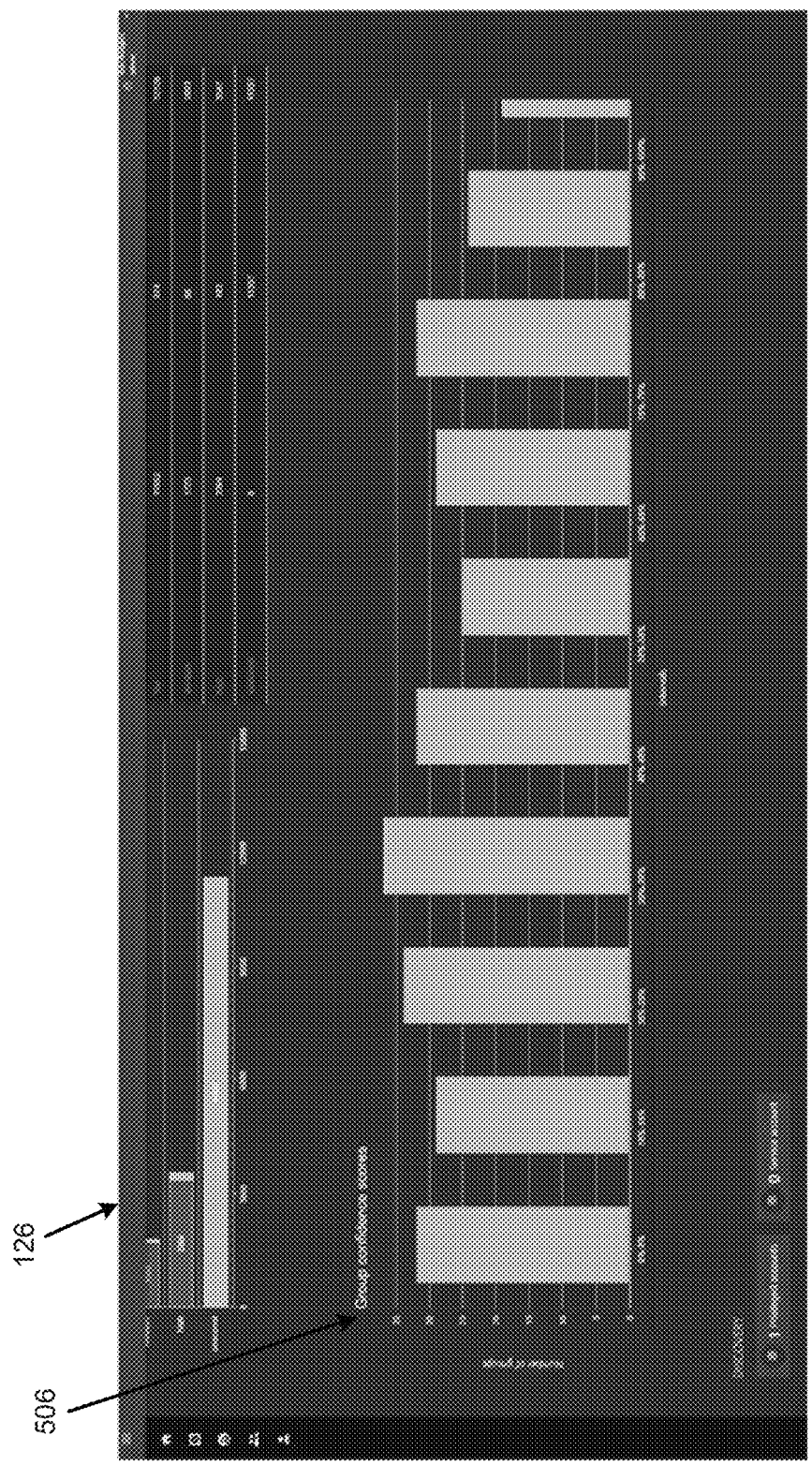
Figure 5D:
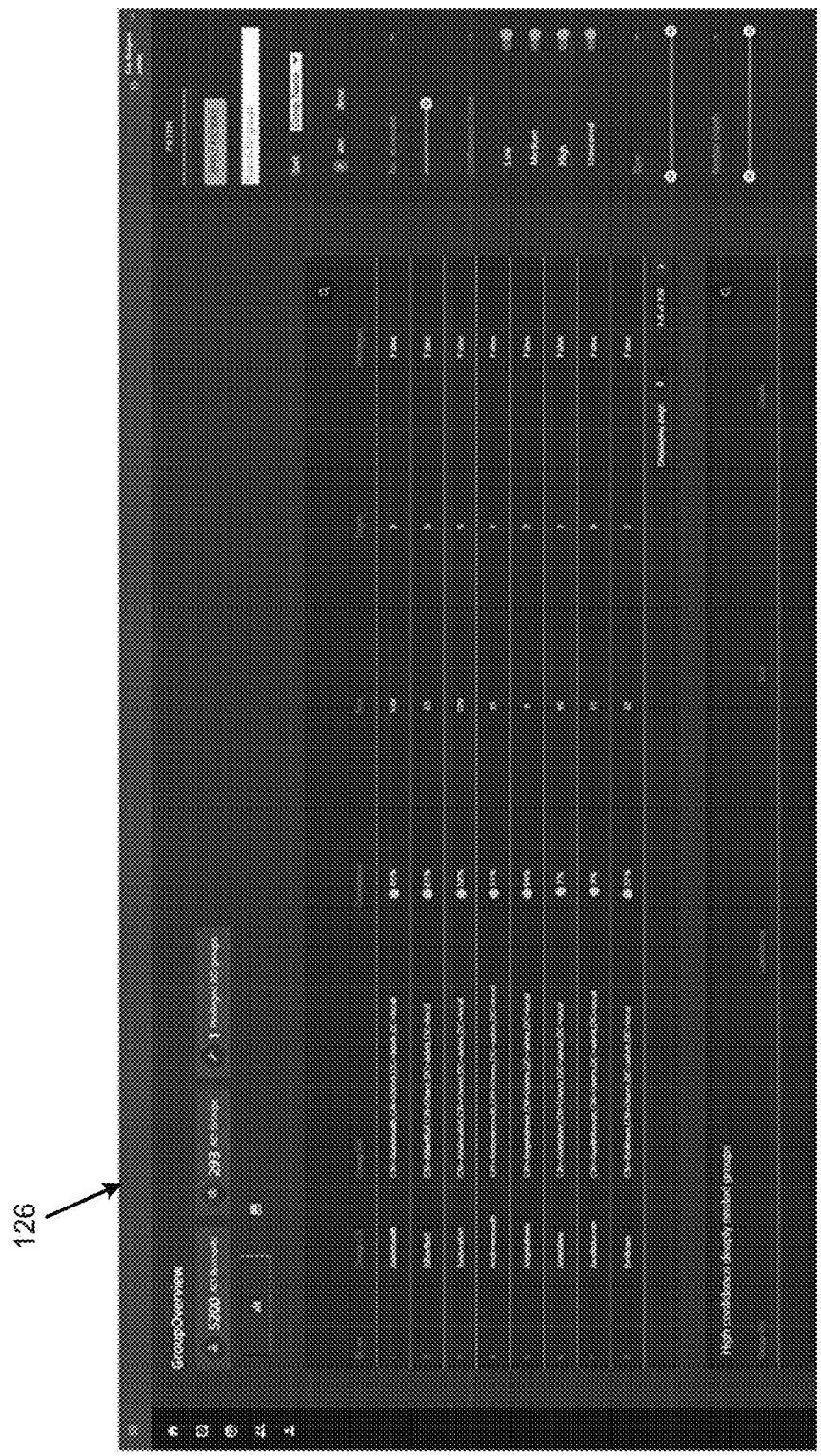
FIGS. 5D and 5E illustrate group overview displays.
Figure 5E:
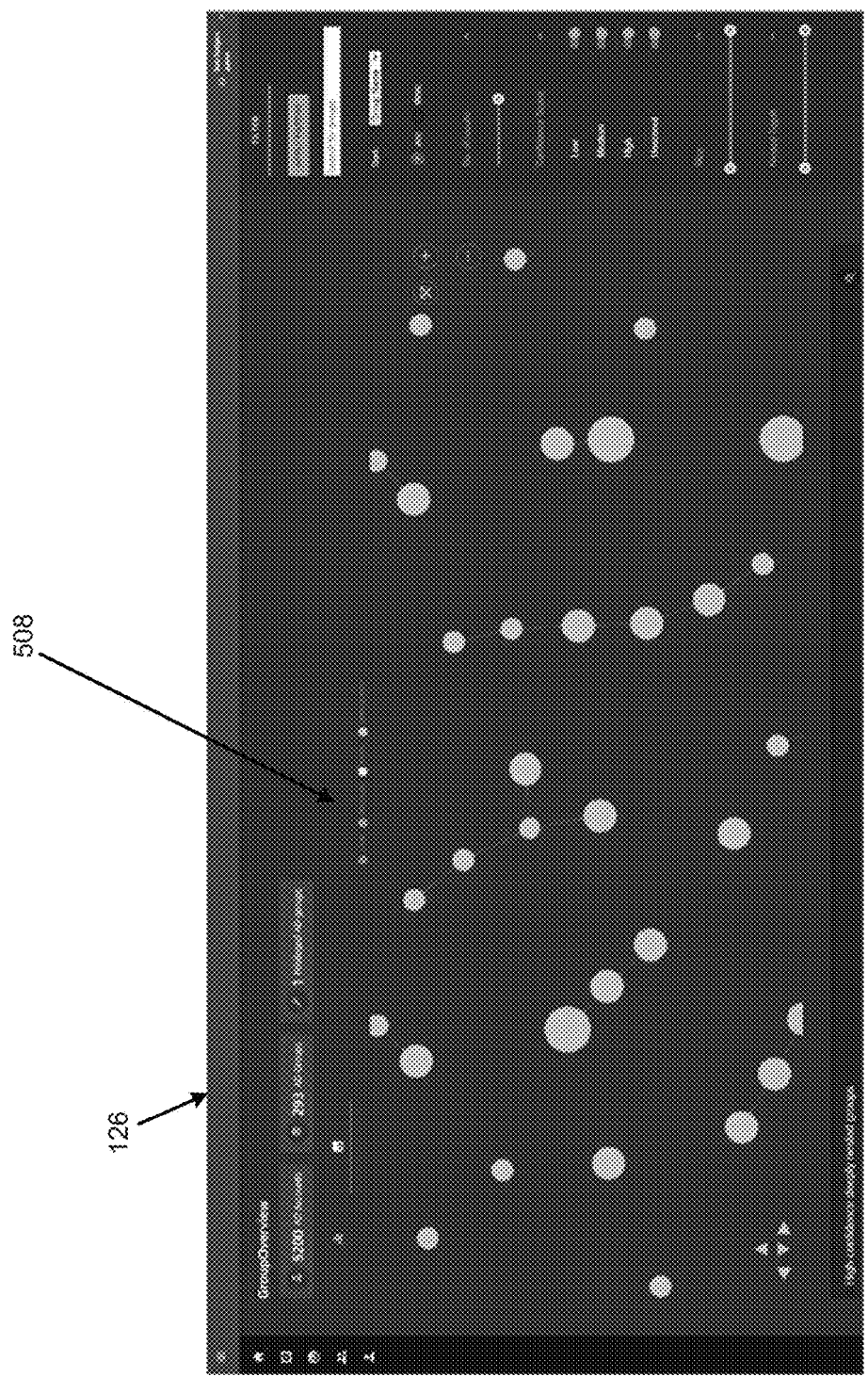
Figure 5F:
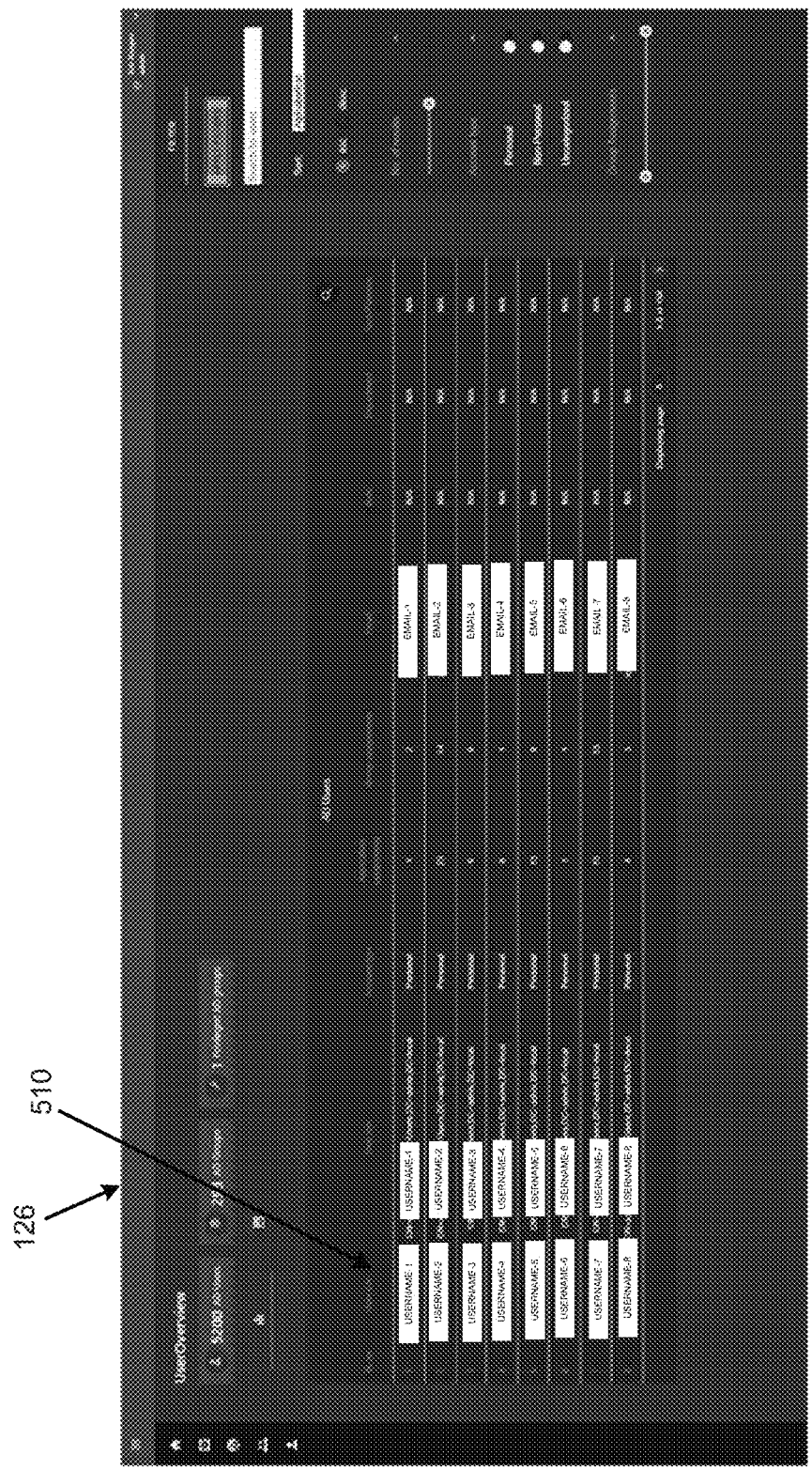
FIGS. 5F and 5G illustrate user overview displays.
Figure 5G:
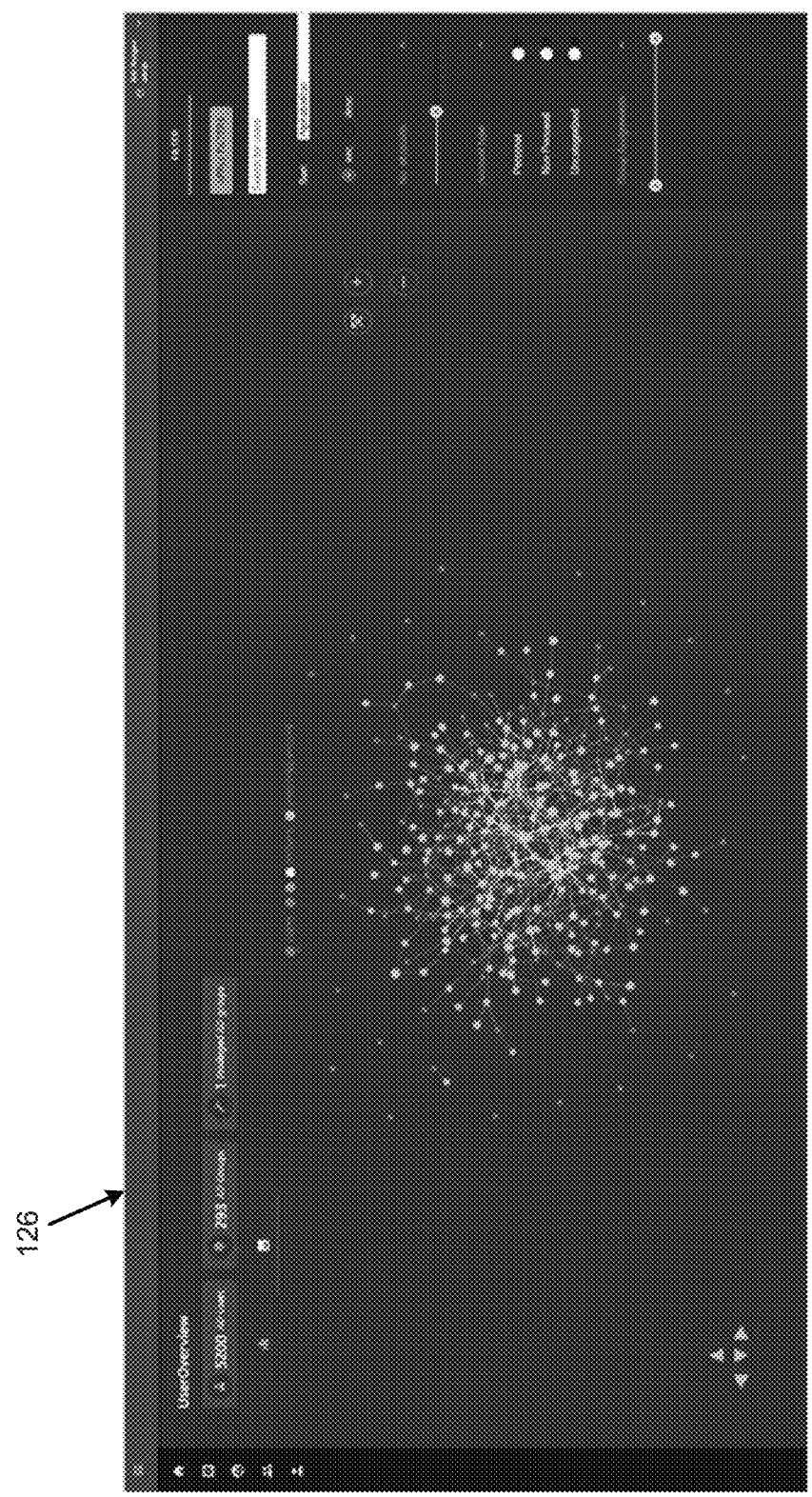

According to examples disclosed herein, the active directory visualization generator 124 may generate the at least one display 126 that includes a user overview display (e.g., FIGS. 5F and 5G). The user overview may include a search capability where the user can search based on usernames at 510 (e.g., user cn (common name), dn (distinguished name) or sAMAccountName in active directory terms), and filter the search based on number of results, account type (e.g., personal, non-personal, uncategorized), and number of group assignments (e.g., minimum and maximum). The search results may be viewed either as a graph or a table, with an option to order the table results (e.g., ascending or descending order) based on alphabetical ranking (e.g., username), group size, group depth, and confidence score.

Figure 5H:
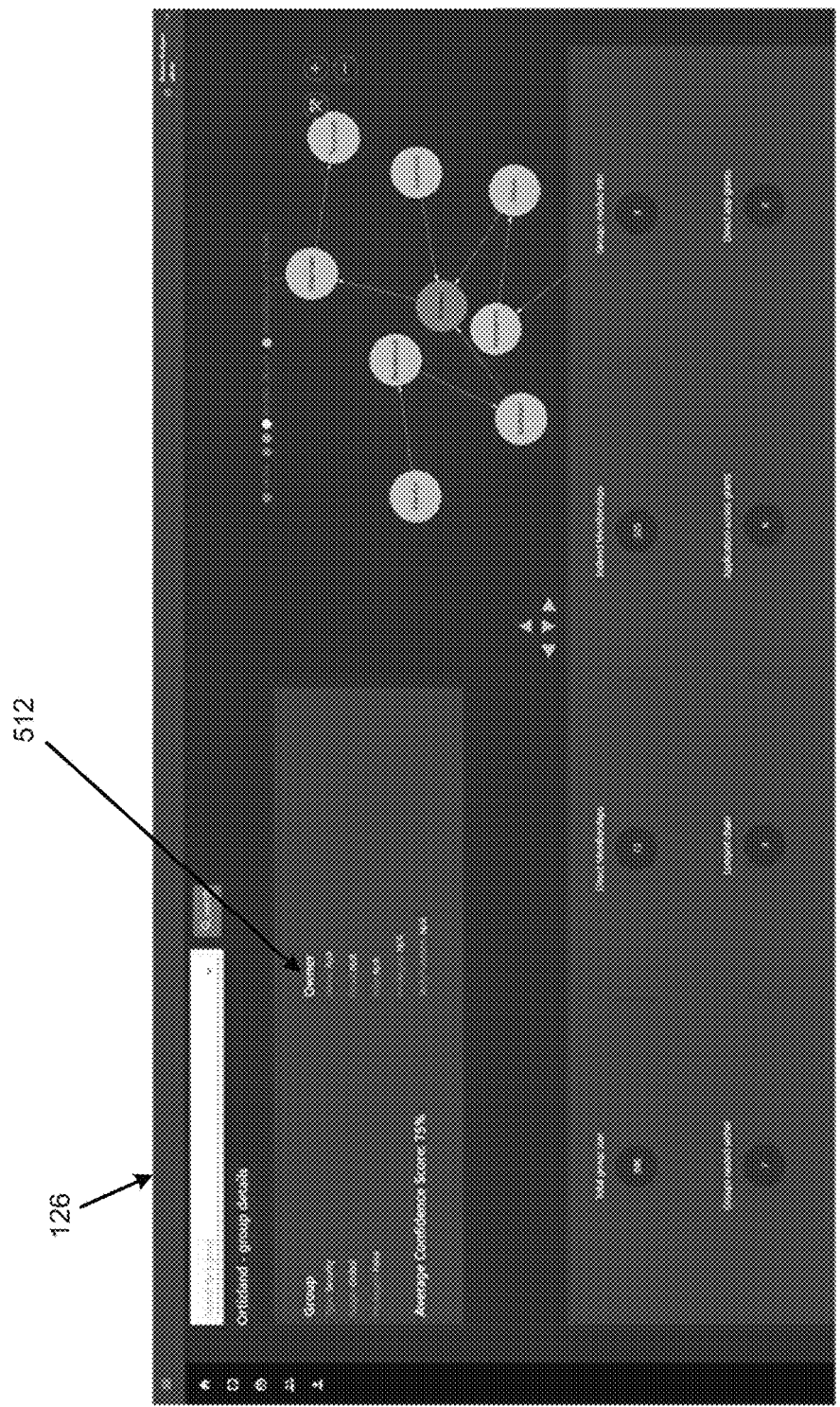
FIGS. 5H and 5I illustrate group details displays.
Figure 5I:
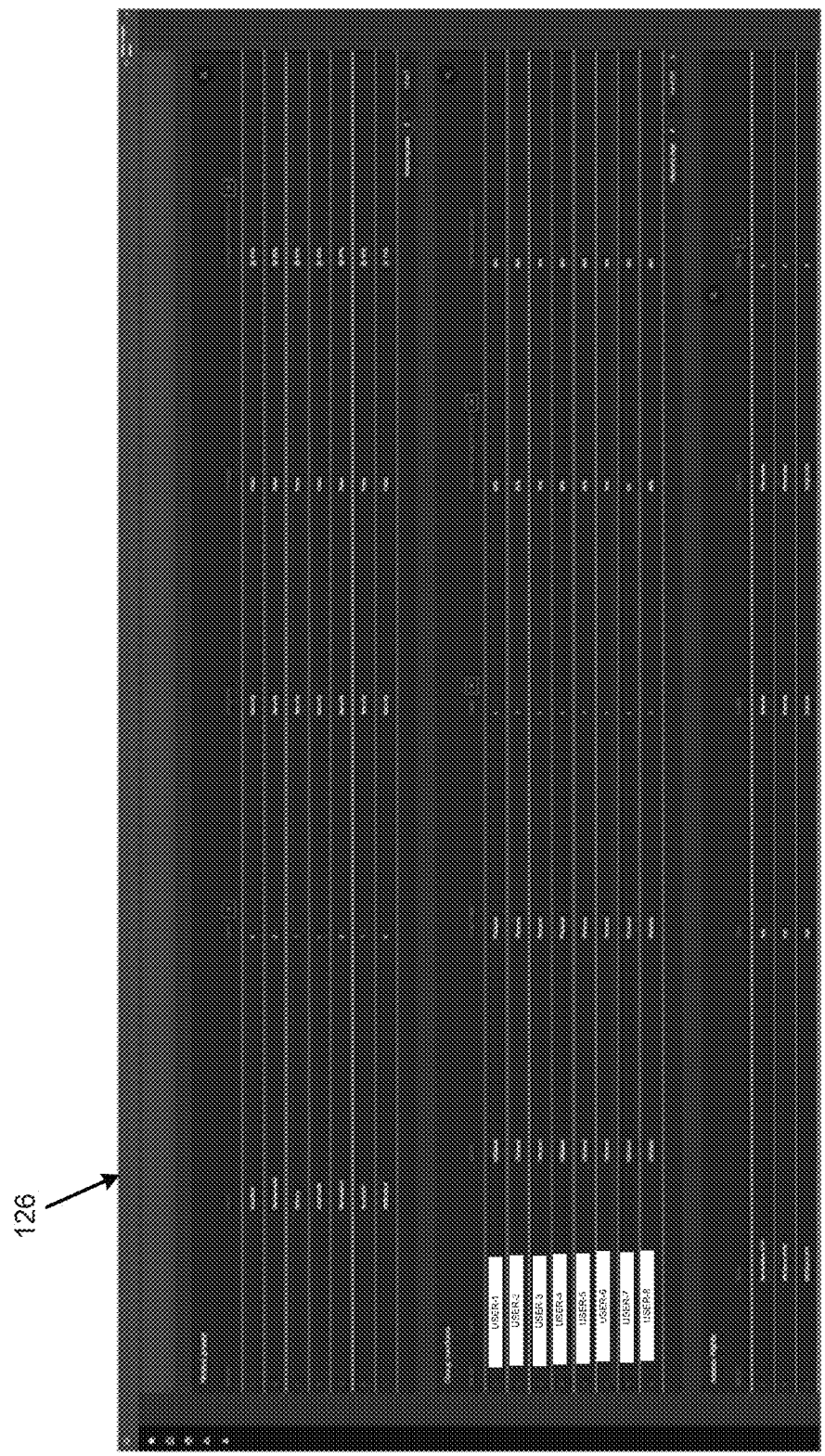

According to examples disclosed herein, the active directory visualization generator 124 may generate the at least one display 126 that includes a group details display (e.g., see FIGS. 5H and 5I). Group details may include, for example, type, domain, description, purpose, etc., owner details at 512 (e.g., name, email, role, privileged, technology/function), average confidence score, and justification. Group details may further include a graph representation of the group and its hierarchy, aggregate information about the group (e.g., total group size, direct members, indirect members, groups nested within, groups nested into, longest chain, app access grants, direct app grants, indirect app grants, tables with the following data (group members (name, account type, direct or indirect, average confidence score, justification)), and access rights (name, type (app, fileserver etc.)), access type (read, write execute etc.), direct or indirect).

Figure 5J:
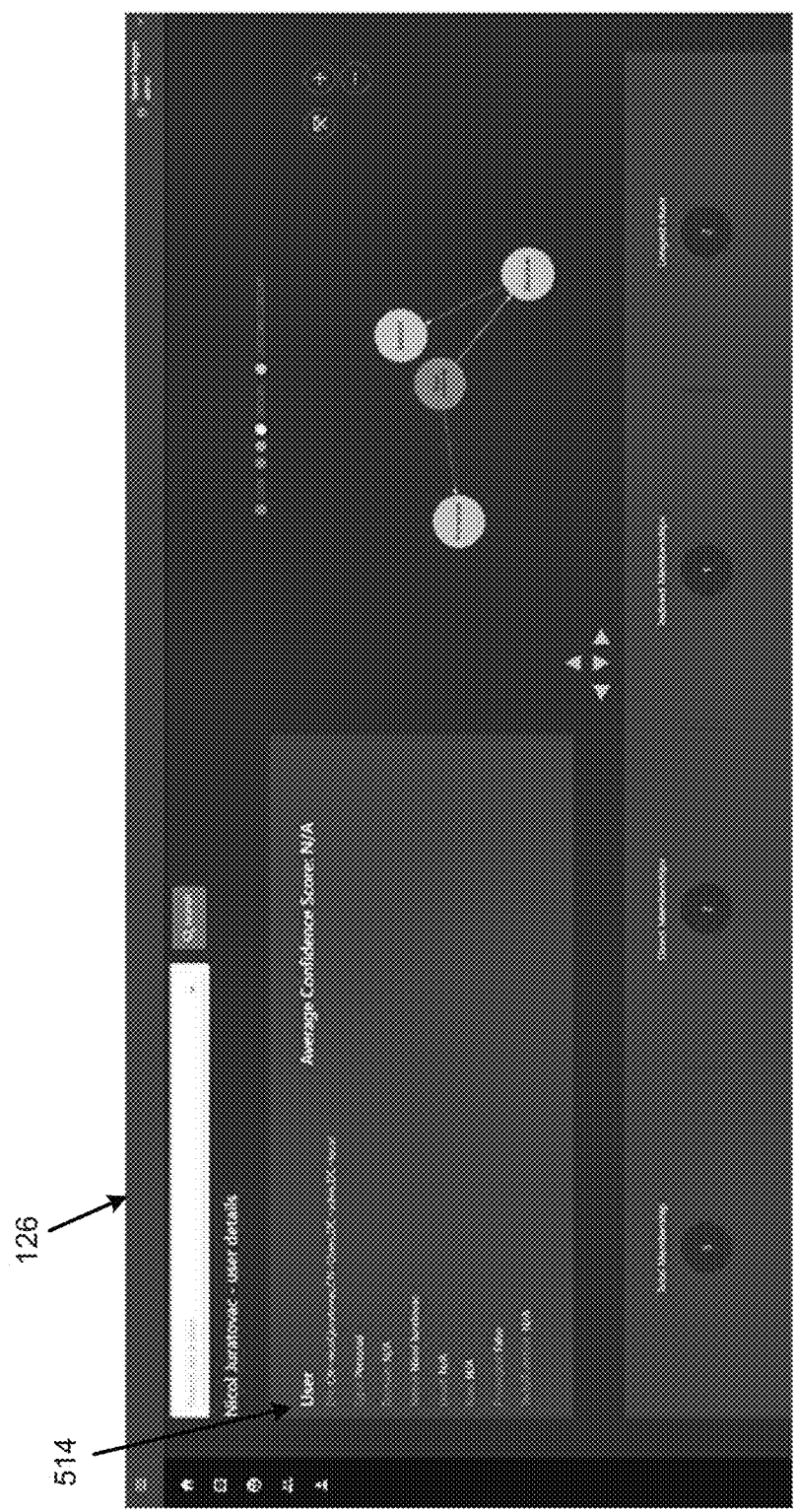
FIGS. 5J and 5K illustrate user details displays, to illustrate operation of the active directory management and remediation apparatus of FIG. 1, in accordance with an example of the present disclosure.
Figure 5K:
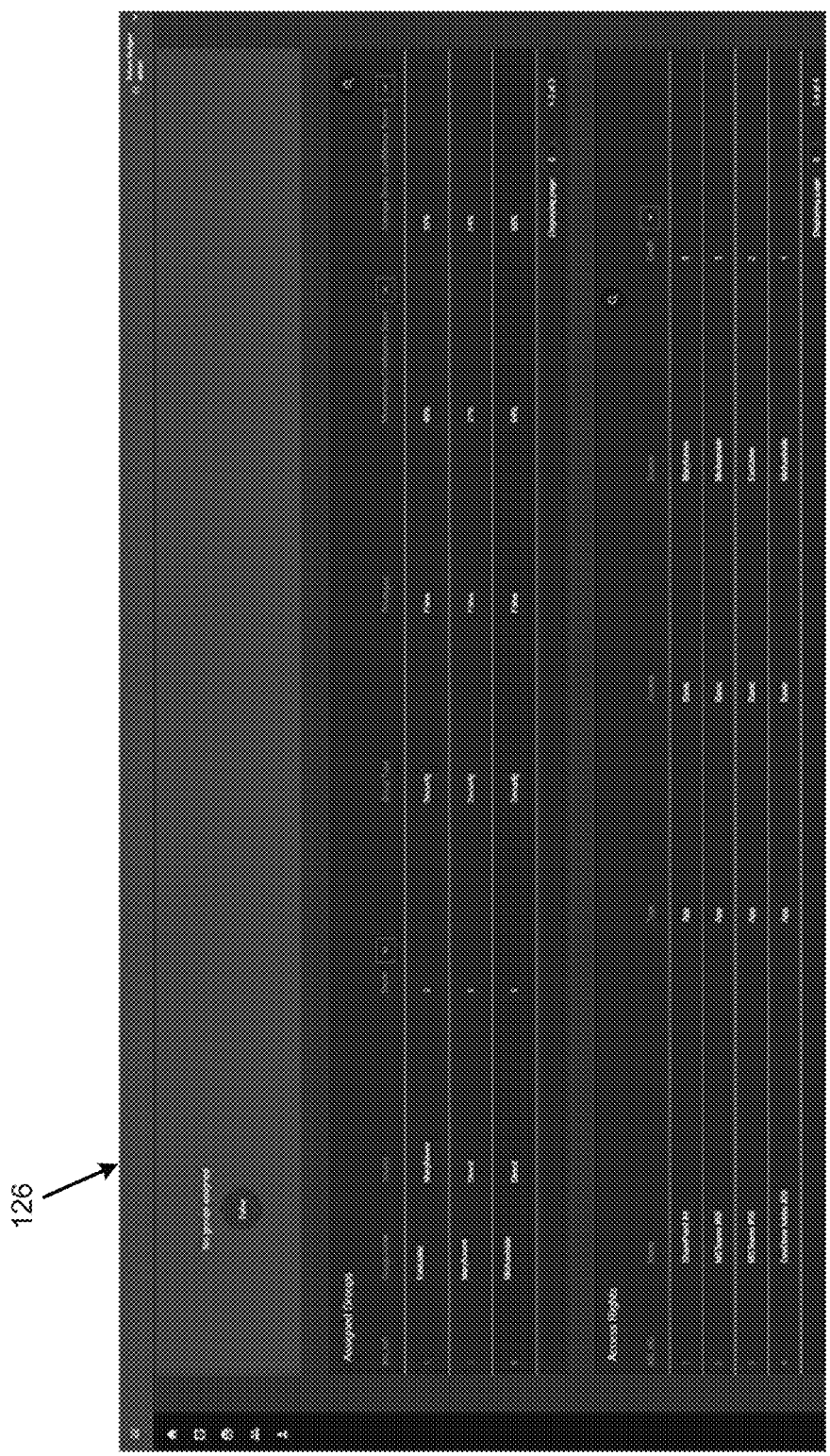

According to examples disclosed herein, the active directory visualization generator 124 may generate the at least one display 126 that includes a user details display (e.g., see FIGS. 5J and 5K) that includes a hierarchy of groups a selected group is nested into. User details at 514 may include, for example, type (personal/non-personal), domain, name, emailed, role, privileged/unprivileged, technology/function, average confidence score, justification, etc. User details may also include a graph representation of the user and associated group memberships, aggregate details about the user such as total memberships, direct memberships, indirect memberships, application access grants, direct application grants, indirect application grants, privileged user/unprivileged user, no groups assigned (true/false). User details may also include tables with the following data that includes assigned groups (e.g., group name, direct/indirect, group type, group depth, privileged/unprivileged, membership confidence score, average group confidence score, group confidence justification) and access rights (e.g., name, type (application, file server etc.), access type (read, execute, administrator), direct/indirect, etc.

According to examples disclosed herein, the active directory remediator 122 may remediate, based on the analysis, for each identified user to group membership of the user to group memberships, of the membership score 118 and the reasoning 120 for the membership score 118, the at least one of the user to group memberships by removing the at least one of the user to group memberships. With respect to remediation of the user to group memberships based on analysis of the membership score 118 and the reasoning 120 for the membership score 118, based on confidence scores, low confidence outliers may be considered for remediation (e.g., access removal).

According to examples disclosed herein, the active directory remediator 122 may remediate, based on the analysis, for each identified user to group membership of the user to group memberships, of the membership score 118 and the reasoning 120 for the membership score 118, the at least one of the user to group memberships by modifying, without removing, the at least one of the user to group memberships.

An insights generator 128 that is executed by at least one hardware processor (e.g., the hardware processor 1002 of FIG. 10, and/or the hardware processor 1204 of FIG. 12) may generate, based on a query 130 by a user 132, an insight that includes an indication of groups the user 132 is a member of, and confidence values associated with the groups the user 132 is the member of (e.g., see FIG. 2B for determination of confidence scores). For example, the query 130 may specify "Please indicate groups that user ABC is a member of".

According to examples disclosed herein, the insights generator 128 may generate, based on the query 130 by the user 132, the insight that includes an indication of at least one application accessible by the user 132 based on groups the user 132 is a member of. For example, the query 130 may specify "Please indicate applications accessible by user ABC".

Operation of the apparatus 100 is described in further detail with reference to FIGS. 1-9.

Referring to FIG. 1, with respect to discovery, analysis, and remediation of active directory group data quality issues including ownership, assignments, permissions, nesting, and access creep, as well as the use of graphs and graph algorithms to determine access patterns and assignment models to act on incorrect access grants and over-privileged users, the data model generator 102 may generate the data model 108 that includes active directory accounts and groups, along with the concepts of ownership, service accounts, group membership, group nesting, and application access. Access creep may represent an identity term used to define accumulation of unnecessary permissions or access rights for a user. In the active directory use case, access creep may refer to unnecessary group memberships given to a user that have not been reviewed or recertified. The data model may be built on a graph database, providing for the modeling of the mentioned concepts as nodes and relationships. In this regard, for the underlying database, as shown in FIG. 2A, each node (e.g., circle as shown at 200) and relationship (e.g., arrows with boxes containing relationship labels) may have a "type", and contain properties that hold information. Node and relationship properties may be specified in the boxes next to the nodes.

The membership score generator 116 may score group memberships to obtain an indication of proper and improper membership grants. The membership score (e.g., as shown in FIG. 2A) may include two parts, a score which can be a numerical value (0-100) or classification (good, ok, bad), and a reasoning 120 for the score. For example, a numerical confidence score (used as the membership score 118) of user to group membership, and a reasoning, which may be designated as the justification for the confidence score, may be determined. Group justification (e.g., GROUP_JUSTIFICATION) may be generated by autonomous identity as the most common human representative attributes shared by the members of the group. For example, if the only common aspect about members of a group is that they are in the same department, then the justification would be department ABC. Access type (e.g., ACCESS_TYPE) may represent the permissions granted to the user on the end system (e.g., read, write, execute etc.). With respect to INFO_FROM, as data for end systems could be obtained via multiple complementary data sources (CMDB etc.), the INFO_FROM attribute stores the source of the data. The SYSTEM_TYPE attribute may be used to store information about the end system (e.g., a file server, application, database etc.).

Figure 3:
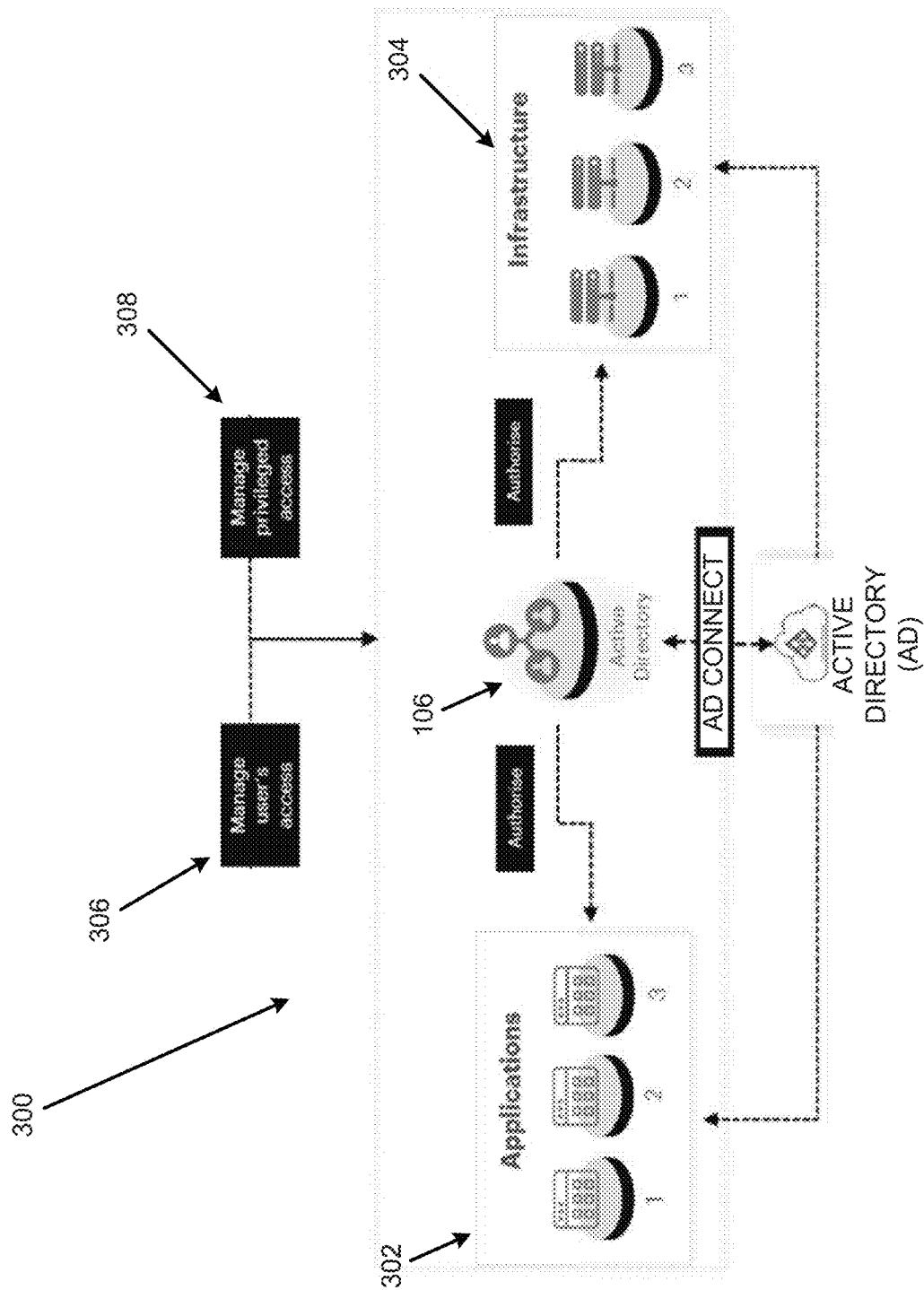
FIG. 3 illustrates an access management layout to illustrate operation of the active directory management and remediation apparatus of FIG. 1 in accordance with an example of the present disclosure.

FIG. 3 illustrates an access management layout to illustrate operation of the apparatus 100 in accordance with an example of the present disclosure.

Referring to FIG. 3, the access management layout 300 may provide a limited view of active directory groups, their ownership, and access they grant to applications at 302. In this regard, the active directories 106 may authorize access to the applications at 302 and infrastructure at 304. User access and privileged access aspects of the active directories 106 may be respectively managed at 306 and 308. Further, access to safes may be controlled through active directory groups, but may include limited visibility with respect to active directory group mapping. For the access management layout 300, the layout may include deep nesting (e.g., up to 11 levels) with very limited view on who receives access to what due to complex nesting. For the access management layout 300, the apparatus 100 may provide for implementation of visibility and data driven insights, mapping between active directory groups based on visibility and data driven insights, mapping between active directory group and applications that are authorized using the active directory groups, and opening of audit actions to establish a purpose for each active directory group.

Referring again to FIG. 1, the active directory visualization generator 124 may generate views for visualization, contextualization, and correlation. The visualization may represent technique(s) used for presenting active directory group information and associated relationships in user friendly views, which may be utilized to search, filter, and view needed details. With respect to visualization, for a user interface, there may be, for example, five different views that are available for exploring active directory group and user information. These views may include dashboard, group overview, user overview, group details, and user details. With respect to graph based navigation and visualization, the views may include a graph based navigation and visualization approach. On the group and user overview pages, the search results that are obtained may be viewed as graph nodes, for example, with arrows that represent relationships between them. The group overview page may also include color cues according to the average confidence score for a group, to facilitate identification of low confidence outliers. The confidence score may be determined, for example, using an autonomous identity engine, which provides a numerical confidence score based on usage, and number of similar users assigned a group. For example, the confidence score for a user to group membership may be determined using an artificial intelligence/machine learning algorithm that factors in the user's human resources details and the density of similar users within the group (e.g., how similar are the users in the group compared to all users in the organization). Once the confidence score and justification are obtained, low confidence outliers may be identified by having a configurable "cut-off". For example, any group membership scored less than 20% confidence may represent low confidence, and greater than 90% confidence may represent high confidence. The group and user details pages may focus on a single user or group. The graph visualization in the user details page may include a hierarchy of all of the groups the selected group is nested into, along with all of the groups that are nested into the selected group. This, along with color cues on confidence score may indicate the changing confidence through the hierarchy, and may be utilized to identify links that need to be broken. For example, the links that are identified may represent group membership between groups (e.g., MEMBER_OF relationships between Group nodes) that lead to lower confidence scores with members due to inheritance of group members.

With respect to search filters for group and user overview, the active directory visualization generator 124 may facilitate search and filtering of active directory groups and users via overview pages. Each overview page may allow for a user to switch between viewing the search results in a table or a graph representation. The search capability may provide a number of filtering options for the user. For example, the filtering may include filter on name (common name, distinguished name, or display name), filter on depth of group or user (e.g., depth is the nesting depth as a result of group nesting), filter on total group size, and filter on average confidence score (e.g., low, medium, high, unscored). The overview pages may also allow the user order the results according to the filters specified above.

The contextualizing may include technique(s) used for deriving additional insights using group relationships, group nesting, usage patterns and user memberships), which may be utilized to perform a data driven clean-up approach and implementation of quality decisions.

The correlation may include technique(s) used for integrating and correlating data from multiple sources, and enriching active directory group metadata beyond user memberships, to applications and servers that are managed using active directory groups. With respect to correlation, in order to obtain access to an application (or server), a user may be added to a group that grants access to it. Direct or indirect access to applications may be identified via direct or indirect membership to the groups that grant the access.

Application access grants via groups may be obtained via several external feeds or sources that store information about application access control. For example, application permissions may be obtained, for example, from SailPoint IIQ™, which may store an active directory group to application access mapping. Administrative access to the same application may be controlled, for example, via Cyber Ark™, and application maintenance and hosting information may be stored, for example, in Service Now™. By combining this information, a GRANTS_ACCESS_TO relationship may be created, for example, in Neo4j™, and the relevant facts from each source may be stored.

In case of applications that cannot be mapped to groups via the aforementioned techniques, manual discovery may be used along with the already discovered information. In this regard, data may be ingested from multiple external sources of information, and generalized as graph nodes (e.g., END SYSTEM nodes on neo4j) to build relationships to active directory nodes (e.g., AD GROUP nodes on neo4j).

The apparatus 100 may provide for implementation of active directory groups and their associated relationships to be fully visible, suitable for insight, and further for action and remediation. In this regard, the apparatus 100 may provide for execution of a data driven approach to active directory group clean-up and membership remediation due to lack of intuitive visualization capabilities and the ability to derive insights from current access assignments. In this regard, the user active directory visualization generator 124 may implement lightweight user interface technologies to provide dashboard, aggregate, and detailed views for analysis. Artificial intelligence and machine learning may be utilized to provide the needed context to learn and derive insights from ingested active directory and identity data, providing patterns of usage, confidence in assignments, and associated reasoning. Hierarchical data may be represented with capabilities to expand and accommodate multiple relationship models (e.g., groups, users, owners, applications, servers), and management of relatively large amounts of data and relationships at scale.

The data model generator 102 may ingest active directory data by obtaining active directory data and representing groups, accounts, attributes and membership as nodes and vertices in a database.

The data model generator 102 may flatten active directory nesting via graph queries by flattening group nesting structures via graph queries to provide an indirect membership between accounts and groups. With respect to flattening of group nesting structures via graph queries, cypher queries may be used to obtain a flattened group nesting structure as follows:

MATCH (g:AD_GROUP)<-[:MEMBER_OF*]-[u:AD_USER] return g,u

Using a "*" to match one or more MEMBER_OF relationships traverses the group nesting structures as the same relationship is used for group to group nesting membership. Group nesting depth may be identified by measuring the number of MEMBER_OF relationships traversed between the group and user.

The membership score generator 116 may generate confidence scores for a graph 114 by processing data through the graph 114 to obtain confidence scores for direct and indirect group memberships. With respect to utilization of confidence scores to generate aggregate metrics, aggregate metrics may represent totals and percentages of direct or indirect memberships, along with low, medium, or high confidence totals and percentages.

The graph generator 112 may enrich the graph 114 with confidence data by feeding the confidence scores data back into the active directory visualization platform, and generating aggregate metrics.

The active directory visualization generator 124 may generate a visualization via a react based user interface. Further, the active directory visualization generator 124 may utilize a user interface library to visualize the nested group structures of active directory. The active directory visualization generator 124 may generate a display of the confidence score, and user to group assignments.

Figure 4:
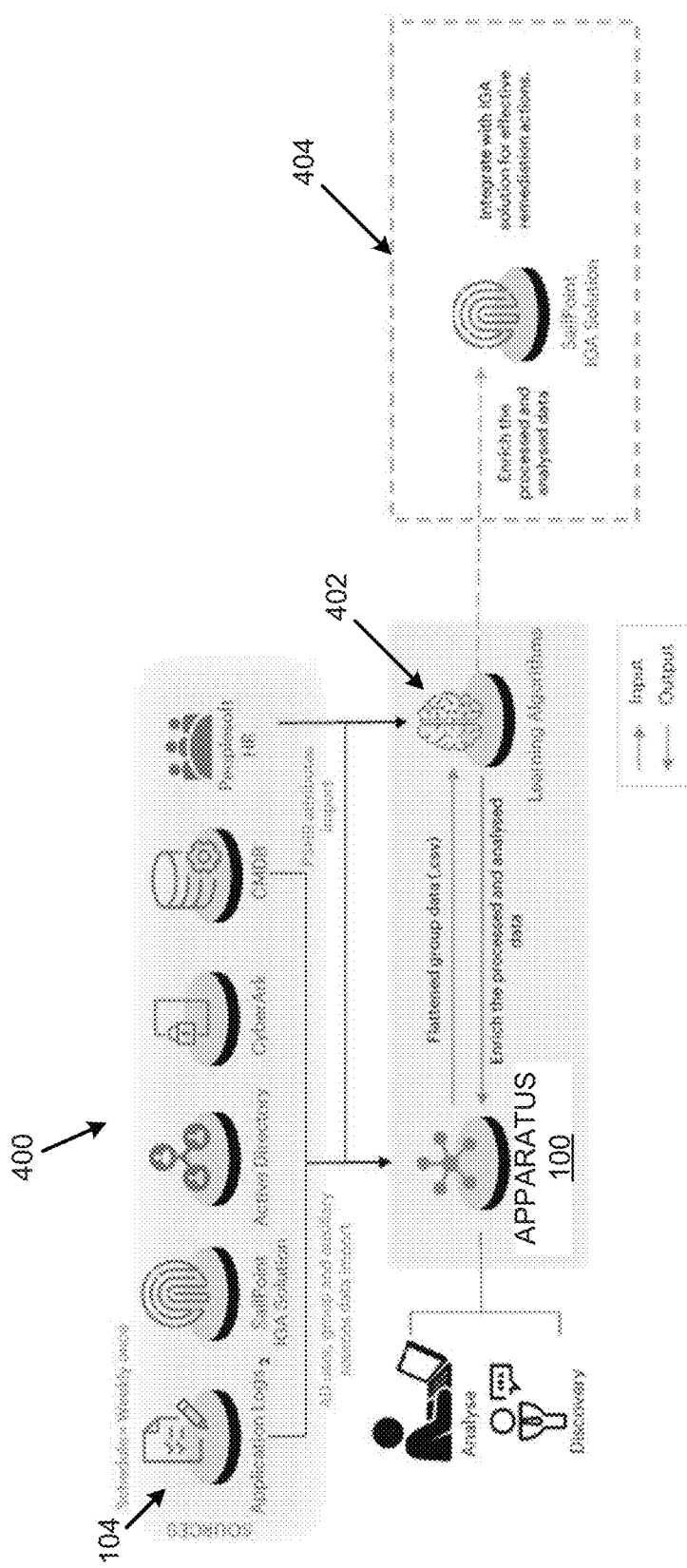
FIG. 4 illustrates an active directory analytics and remediation solution to illustrate operation of the active directory management and remediation apparatus of FIG. 1 in accordance with an example of the present disclosure.

FIG. 4 illustrates an active directory analytics and remediation solution to illustrate operation of the apparatus 100 in accordance with an example of the present disclosure.

Referring to FIG. 4, with respect to the active directory analytics and remediation solution 400, the apparatus 100 may provide the required capability and context to discover and update active directory groups and associated relationships. In this regard, referring to FIG. 4, the data 104 may be fed to the apparatus 100, where learning algorithms 402 may be utilized to provide further guidance on remediation actions as disclosed herein with respect to generation of the remediation instructions 134. At 404, the processed and analyzed data may be enriched, and/or integrated with other solutions for performance of remediation actions.

Referring again to FIG. 1, with respect to user experience wire frames, the active directory visualization generator 124 may provide a dashboard view along with a set of targeted views to derive required insights. For example, the views may include a dashboard that includes a comprehensive view of the active directory group information. The views may also include aggregate user and group views that provide the capability to filter and search users and groups along with associated confidence scores. The views may further include detailed user and group views that provide the capability to search for individual active directory groups and associated relationships with users, other groups, and applications. The views may further include backlogs that may be generated based on additional metadata requirements for active directory group analysis.

FIG. 5A illustrates a dashboard comprehensive view 500 to illustrate operation of the apparatus 100, in accordance with an example of the present disclosure.

Referring to FIG. 5A, with respect to the dashboard comprehensive view 500, key insights may include, for example, a total number of active directory groups and users, metrics on active directory group membership and confidence, a focus on low confidence groups, a focus on highly nested groups, and a view on membership confidence scores. These key insights may be selected by actuating the options displayed at 502.

Figure 6:
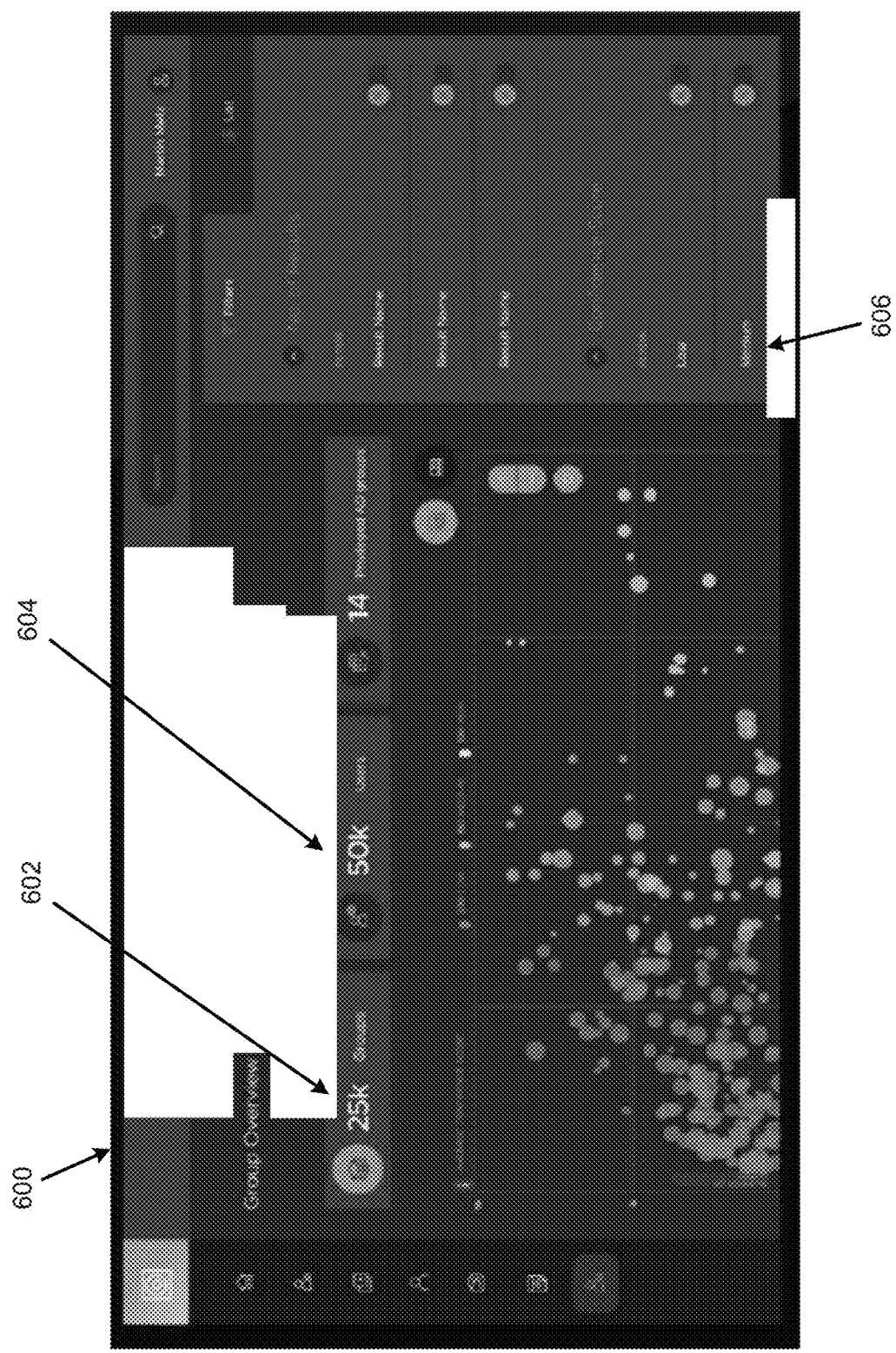
FIG. 6 illustrates group or user aggregate views to illustrate operation of the active directory management and remediation apparatus of FIG. 1 in accordance with an example of the present disclosure.

FIG. 6 illustrates group or user aggregate views 600 to illustrate operation of the apparatus 100 in accordance with an example of the present disclosure.

Referring to FIG. 6, with respect to group or user aggregate views 600, graph views may be built by querying the nodes and relationships from the set of groups and users that are returned from the search query. First all the search results may be obtained, and then MEMBER_OF relationships may be queried between the result set. The views of FIG. 6 may provide the ability to search and filter active directory groups (e.g., at 602) and users (e.g., at 604) based on different criteria. For example, with respect to the group or user aggregate views 600, key insights may include group or user details, group of user relationships, and filtered results. The group or user details may include table layouts containing a high-level overview of the details of the groups or users that provides a starting point for further exploration. The group or user relationships may include graph views containing the relationships between the search results, visualizing hierarchy and membership. Further, filtered results may include a confidence score (e.g., specified at 606), enabling the end user to focus on a subset of results with low, medium, or high confidence. For filtered results, the size filter may be utilized to narrow the search to groups of a certain size, or groups that are at a certain depth in the group hierarchy.

Figure 7:
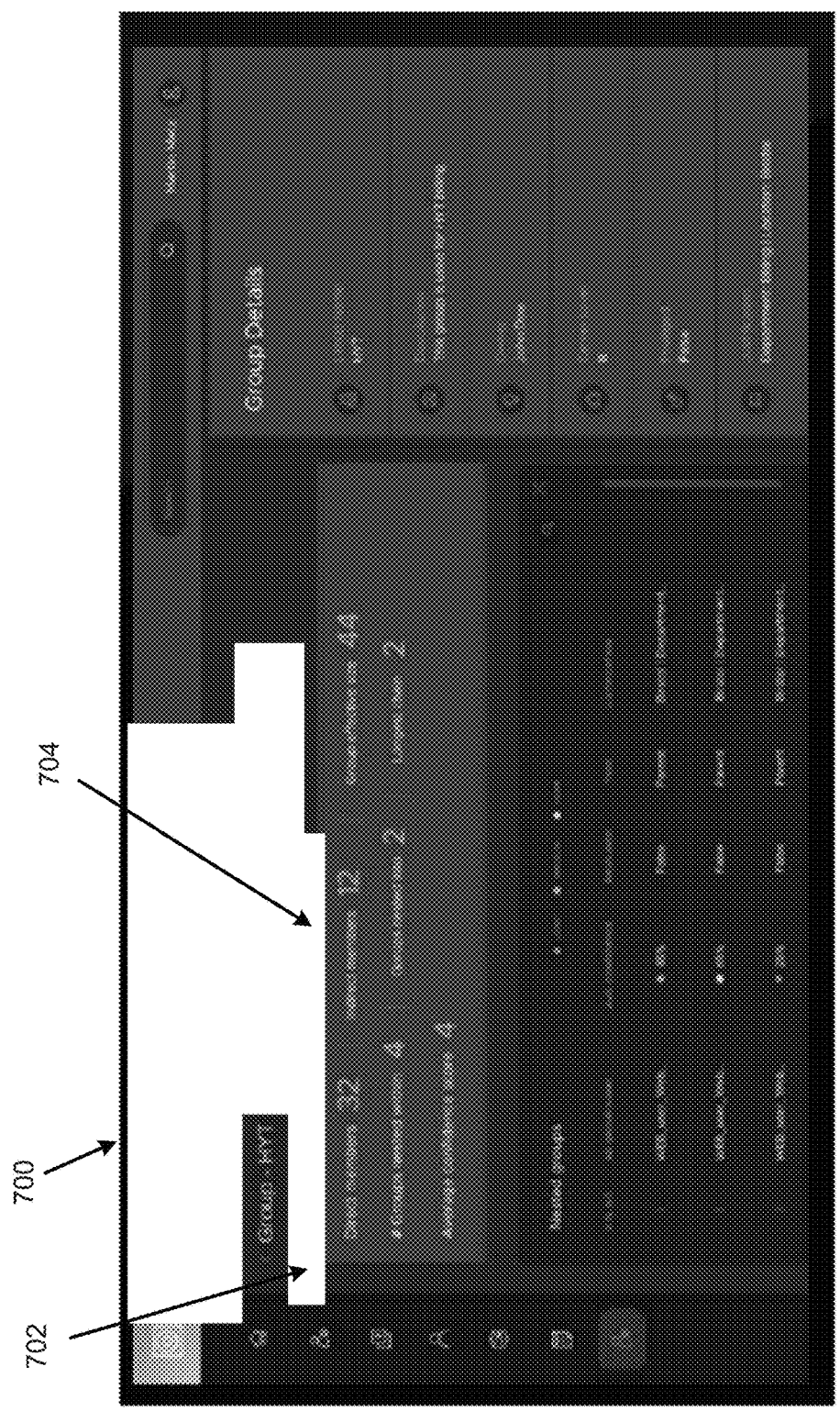
FIG. 7 illustrates targeted group views to illustrate operation of the active directory management and remediation apparatus of FIG. 1 in accordance with an example of the present disclosure.
Figure 7:
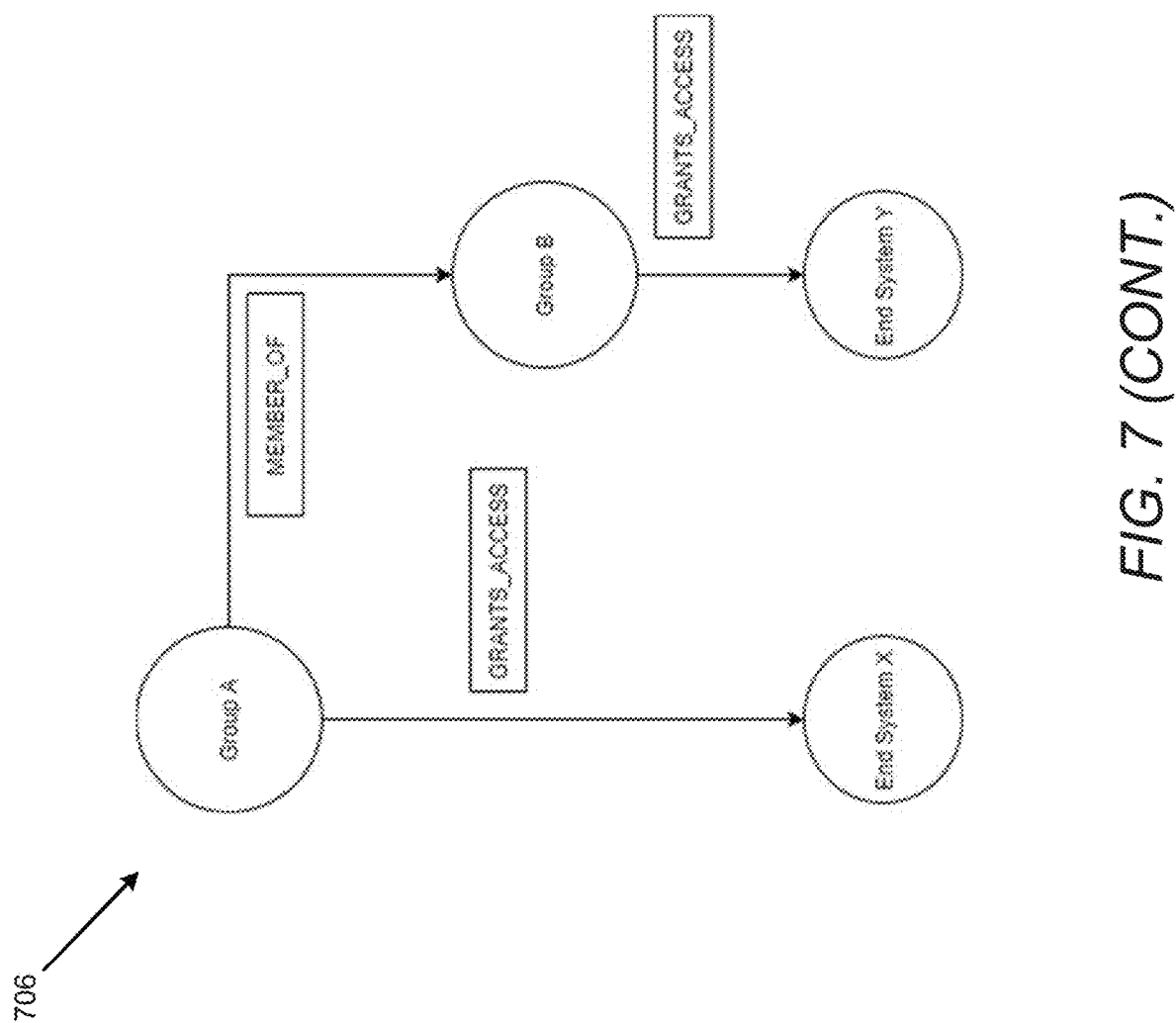

FIG. 7 illustrates targeted group views 700 to illustrate operation of the apparatus 100 in accordance with an example of the present disclosure.

Referring to FIG. 7, with respect to targeted group views 700, groups nesting structures may be obtained using a group's membership data, which may be created into member_of relationships in a database. Since a group's confidence scores may be determined using both direct and indirect members (e.g., at 702 and 704), a nesting change that changes the indirect members may result in a change of confidence score. Direct members of a group are the members that are directly related to a group via a MEMBER_OF relationship. For example, for (User T)→[:Member_of]→(Group A), User T is a direct member of Group A. Indirect members of a group are the members that obtain membership as a result of group nesting, and may be determined using group traversal. For example, for (User T)→[:Member_of]→(Group B)→[:Member_of]→(Group C), User T is a direct member of Group A and an indirect member of Group C.

For FIG. 7, these views may provide the ability to drill down to a per-group level and understand associated relationships. For example, with respect to the targeted group views 700, key insights may include group overview, unrolled group members, application access grants, and nesting structures. Unrolled group members may represent the combination of direct and indirect members of a group (i.e. All the group's members). Group overview may provide an overview of the group including the name, description, owner, reasoning and other available information. Unrolled group members may include group members as a result of group nesting, along with the corresponding confidence scores and reasoning from graph algorithms. Application access grants may include a list of application accesses granted by membership to a selected group, either directly or via group nesting. Further, nesting structures may include a view of a group's nesting structure to facilitate an understanding of changes to confidence score as a result of group nesting.

Group nesting may be performed by adding an active directory group as a member of another active directory group. For example, as shown at 706, there are two end-systems in the example—X and Y. Being a member of group B grants access to End System X, as seen by the GRANTS_ACCESS relationship between Group B and End System Y (this is a direct access). Being a member of group A will grant access to both End Systems X and Y. The access to X is a direct access as seen by the GRANTS_ACCESS relationship. Group A is a member of Group B as there is a MEMBER_OF relationship between them. Therefore, an account which is a member of group A is also a member of Group B and can access both End Systems X and Y.

Figure 8:
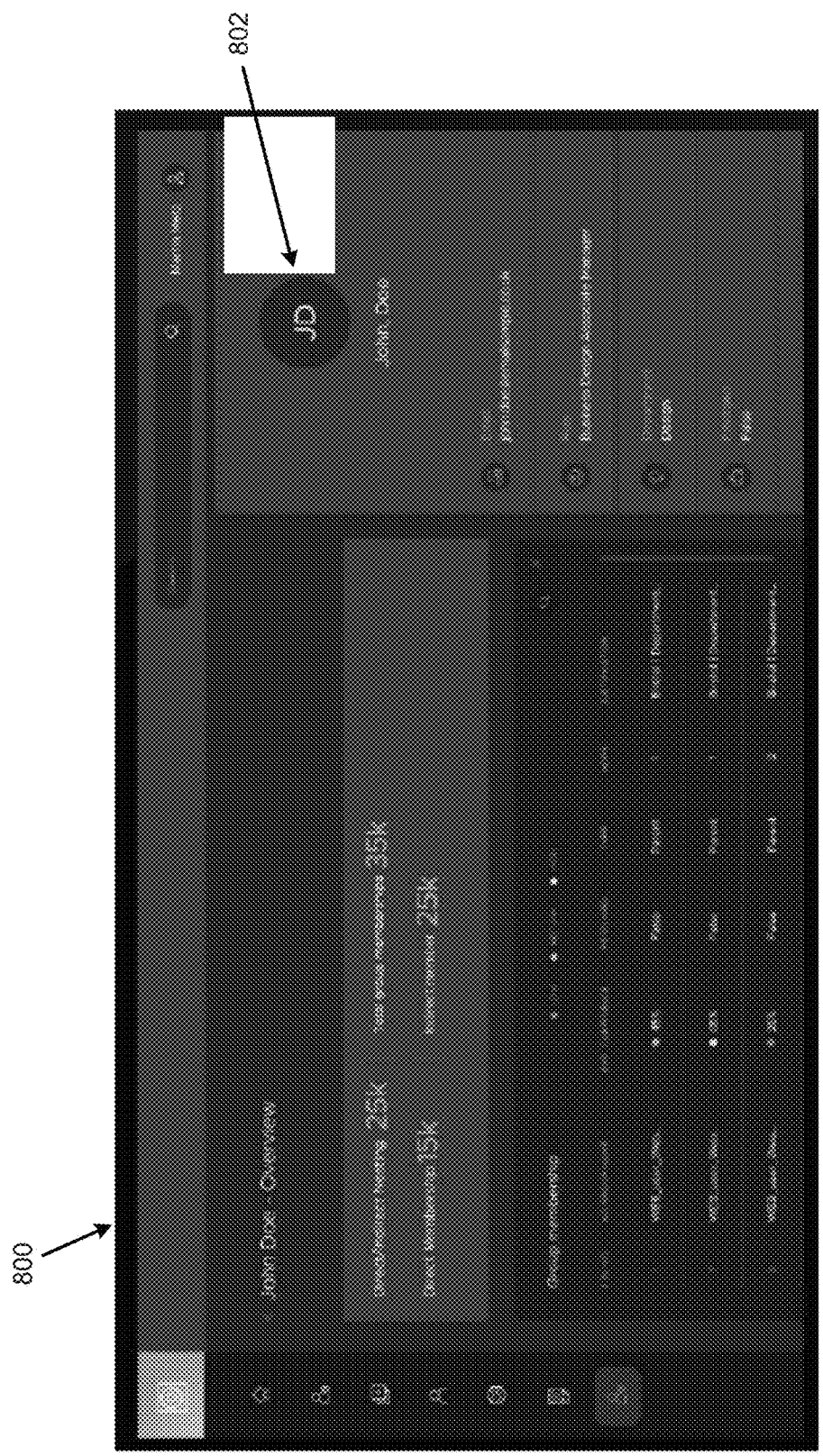
FIG. 8 illustrates targeted user views to illustrate operation of the active directory management and remediation apparatus of FIG. 1 in accordance with an example of the present disclosure.

FIG. 8 illustrates targeted user views 800 to illustrate operation of the apparatus 100 in accordance with an example of the present disclosure.

Referring to FIG. 8, with respect to targeted user views 800, these views may provide the ability to drill down to a per user level (e.g., at 802) and understand associated relationships. For example, with respect to the targeted user views 800, key insights may include user overview, group membership, application access grants, and related user accounts. The user overview may include human resources information of the person associated with the active directory. The group membership may provide an indication of all the groups the user is a member of either directly or indirectly, and the confidence of the membership corresponding reasoning. The application access grants may provide an indication of different applications the user can access through the various groups the user is a member of. Further, the related user accounts may provide an indication of other accounts managed by the same person, or accounts owned by people with a similar set of human resources attributes. With respect to targeted user views 800, direct members of a group may be obtained directly from active directory, and indirect members may be identified using the aforementioned queries for membership. Confidence of an active directory group membership may be obtained via the corresponding identity that owns the active directory user. For example, the confidence of an active directory group membership may be determined via a multi match query such as, find all the users of a group and their corresponding identities, find the membership scores for the identity in the group.

MATCH (g:GROUP)-[:MEMBER_OF*]-(u:ACCOUNT)-[:IDENTITY_ACCOUNT]→[h:IDENTITY]
MATCH (g)-[s:SCORE]-(h)
RETURN u,g,s

Figure 9:
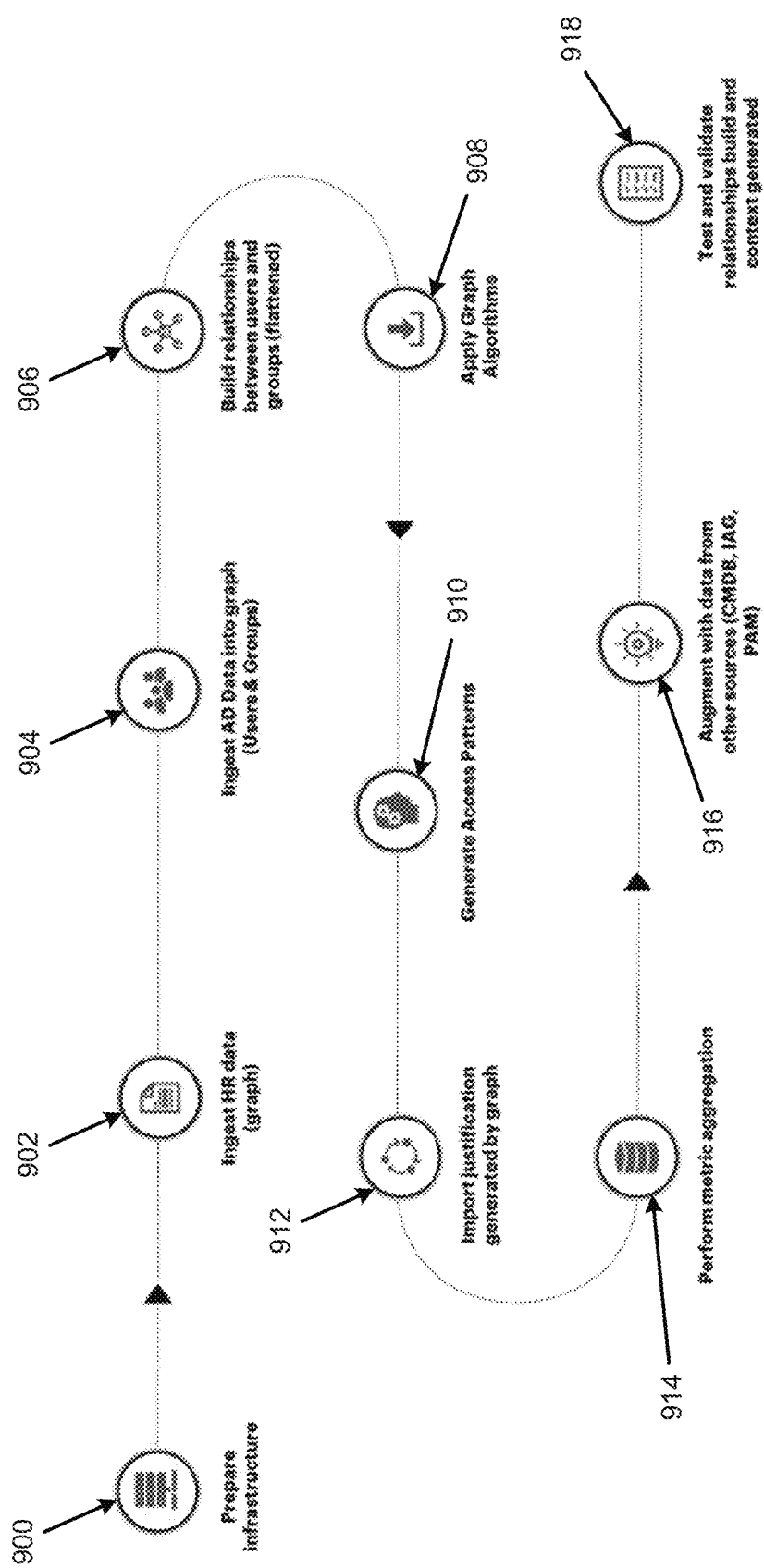
FIG. 9 illustrates steps for data readiness to illustrate operation of the active directory management and remediation apparatus of FIG. 1 in accordance with an example of the present disclosure.

FIG. 9 illustrates steps for data readiness to illustrate operation of the apparatus 100 in accordance with an example of the present disclosure.

Referring to FIG. 9, with respect to block 900 designated prepare infrastructure, active directory visualization may be deployed on a plurality of servers. For example, active directory visualization may be deployed on a Windows™ server used for PowerShell™ scripting with active directory utilities, and a Linux™ server that hosts a Neo4j™ database and a user interface. The user interface (implemented by the active directory visualization generator 124) may be deployed as a docker container (e.g., a static react.js build deployed on Nginx™).

With respect to block 902 designated ingest human resources data (e.g., graph), the human resources data may be ingested into a database, such as the Neo4j™ database, to create IDENTITY nodes which represent a person within the organization. The data may be ingested from comma separated values (CSVs) extracts from the human resources database or a middle system such as active directory.

With respect to block 904 designated ingest active directory data into graph (e.g., users and groups), active directory data may be extracted from an active directory domain controller using scripts developed with an active directory module for example, for PowerShell™. The extracted result may be stored as a set of comma separated values (CSVs). Data, such as, active directory users, active directory (security) groups, and active directory group membership (includes user to group membership and group nesting) may be extracted. Active directory users and groups may be created in Neo4j™, for example, as account and group nodes.

With respect to block 906 designated build relationships between users and groups (flattened), once account and group nodes are available, relationships that include account to group, group to group, and identity to account may be created within Neo4j™. The account to group relationship may represent a membership relationship created directly from active directory data. The group to group relationship may represent membership (nesting) relationship created directly from active directory data. Further, the identity to account relationship may be owned by a relationship created by matching a human resources attribute (for example: user SAP id or email) that is also stored in the active directory.

With respect to block 908 designated apply graph algorithms, graph queries may be used to generate an extract of human resources identity to group assignment. For each group (e.g., group nodes), the direct and indirect members (e.g., account nodes) may be obtained, and then the active directory accounts may be mapped to the owner (e.g., identity nodes).

With respect to block 910 designated generate access patterns, machine learning may be performed on human resources identity to group mapping assignments (e.g., identity to group mapping assignments and human resources attributes may be used by autonomous identity to generate confidence scores and associated reasoning).

With respect to block 912 designated import justification generated by graph, the reasoning and confidence scores may be imported into Neo4j™. For example, using a Python™ script, confidence scores and associated reasoning may be obtained from autonomous identity application programming interfaces (APIs), written to comma separated values (CSVs) and then imported into Neo4j™.

With respect to block 914 designated perform metric aggregation by graph, metric aggregation may be performed to generate total number of members, cached counts of direct and indirect membership for each group, and caching the nested depth of each group.

With respect to block 916 designated augment with data from other sources (CMDB, IAG, PAM) by graph, data from other sources may be added to Neo4j™ to create END_SYSTEM nodes. Each END_SYSTEM nodes may include information from multiple sources based on correlation rules that are tailored towards the sources and data available.

With respect to block 918 designated test and validate relationships build and context generated, general testing may be performed to ensure that the data model is built and validated.

Referring to block 902, HR data related to the employees of an organization (e.g., users) may be ingested into the graph database. This is required for associating active directory users and groups with the users/employees whose data attributes are used later for the confidence score generation.

Referring to block 904, active directory data may be ingested into the graph (this includes the active directory users and active directory security groups). This also includes building the relationships between the user and group nodes to represent the user memberships and the group hierarchies as-is at block 906.

Referring to block 908, using the relationships between users and groups (generated at block 906), the indirect relationships between users and their indirect group memberships may be determined as a result of group nesting. This results in an export of users and all their corresponding group memberships (direct and indirect), which are used for confidence score generation.

Referring to block 910, using the User's HR data (imported in 902), and the export of user to group memberships (generated in 908), a confidence score generation system (e.g., Zoran/Autonomous Identity) may be used to obtain the confidence scores and justifications for each group to user membership. The results may be imported into the graph as MEMBERSHIP_SCORE relationships on the graph at block 912.

Referring to block 914, metric aggregation may be performed to determine aggregate metrics that are displayed on the user interface. Examples include total group memberships for each user, total group members for each group, total direct members for each group, and total indirect members for each group.

Referring to block 916, data from complementary sources of information may be imported into the graph to create END_SYSTEM nodes and GRANTS_ACCESS relationships to active directory groups. Other data such as privilege information about groups or users may be obtained as well (e.g., does a group grant privileged access to users, or does a particular user have privileged access on any end systems).

Referring to block 918, results of blocks 902-916 may be used to perform validation of a user's groups memberships or analysis of outliers that can be identified via the data generated. Groups with many low confidence memberships may be reviewed to understand the reason for the low confidence, and a remediation access may be performed to remove certain users as members or a change in group hierarchy may be made to rectify indirect membership grants).

Figure 10:
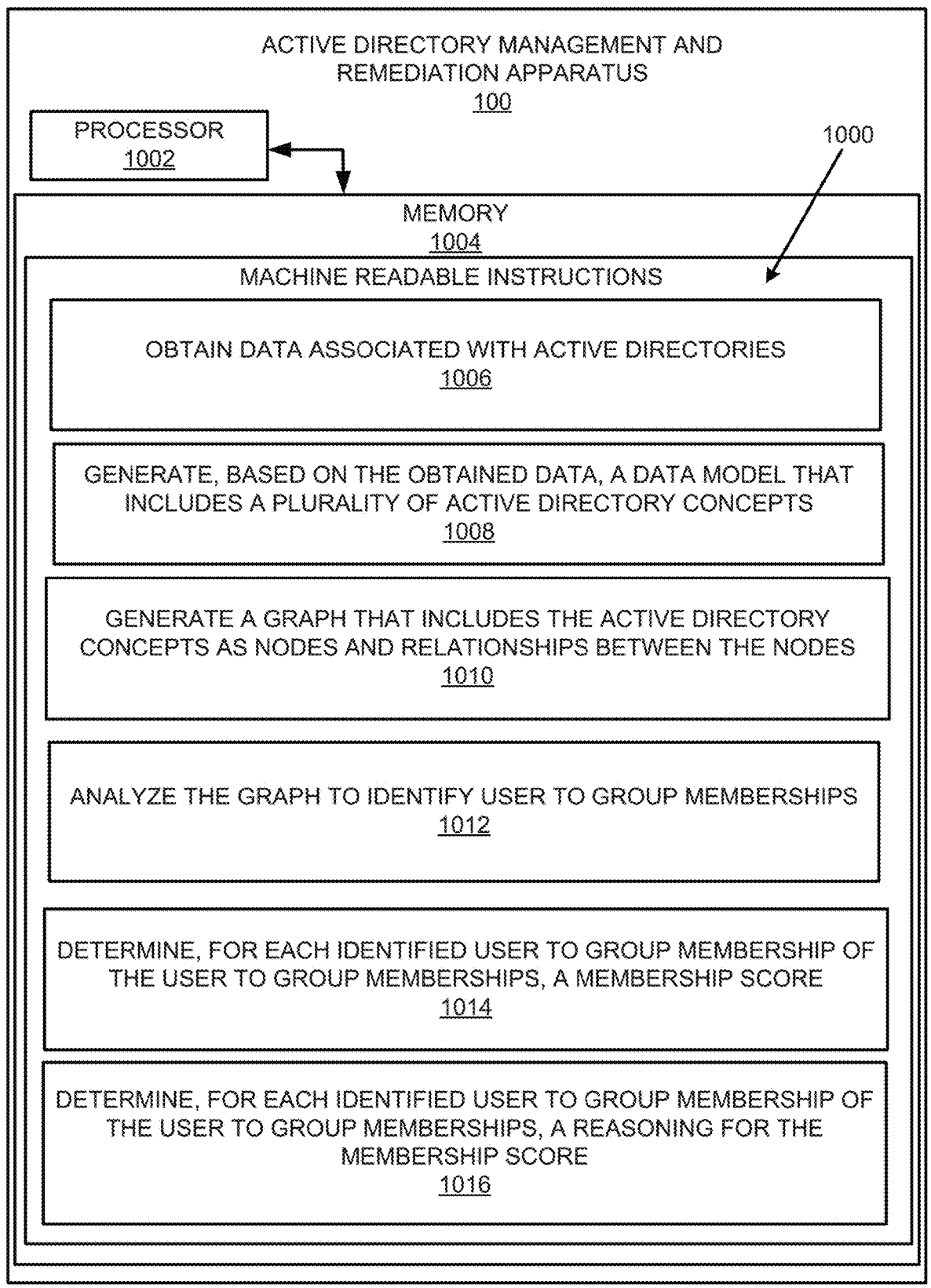
FIG. 10 illustrates an example block diagram for active directory management and remediation in accordance with an example of the present disclosure.
Figure 10:
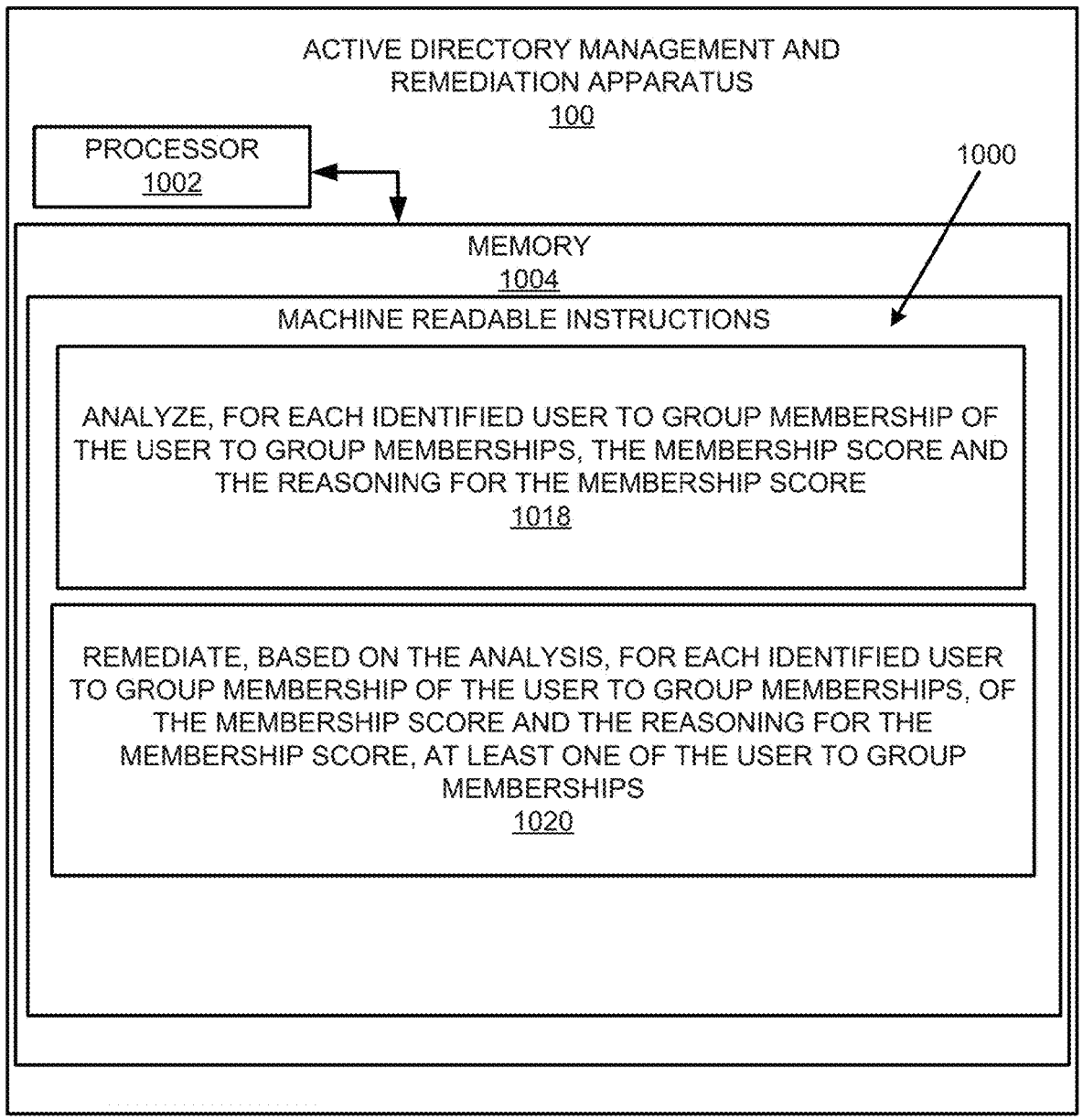
Figure 12:
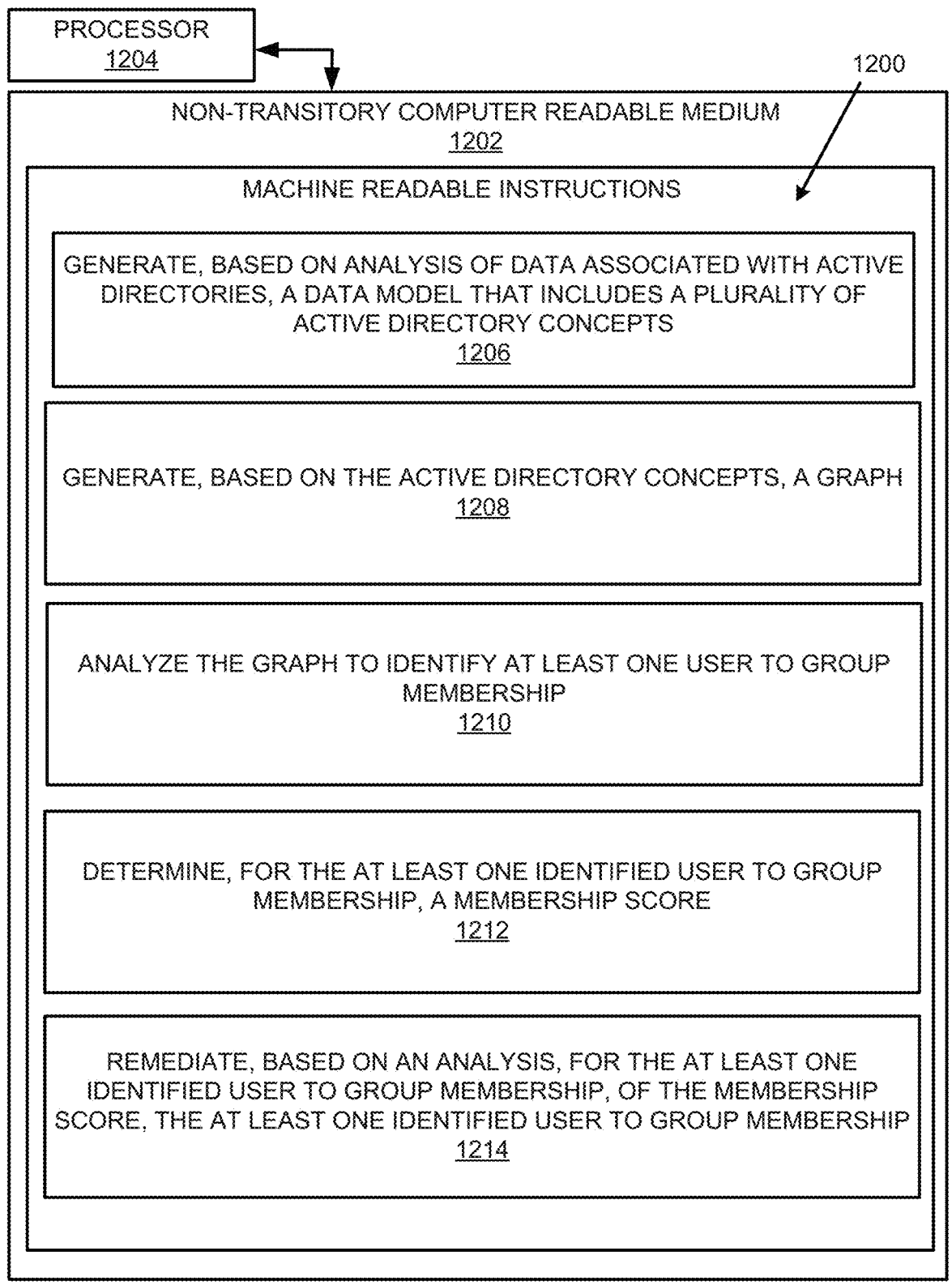
FIG. 12 illustrates a further example block diagram for active directory management and remediation in accordance with another example of the present disclosure.

FIGS. 10-12 respectively illustrate an example block diagram 1000, a flowchart of an example method 1100, and a further example block diagram 1200 for active directory management and remediation, according to examples. The block diagram 1000, the method 1100, and the block diagram 1200 may be implemented on the apparatus 100 described above with reference to FIG. 1 by way of example and not of limitation. The block diagram 1000, the method 1100, and the block diagram 1200 may be practiced in other apparatus. In addition to showing the block diagram 1000, FIG. 10 shows hardware of the apparatus 100 that may execute the instructions of the block diagram 1000. The hardware may include a processor 1002, and a memory 1004 storing machine readable instructions that when executed by the processor cause the processor to perform the instructions of the block diagram 1000. The memory 1004 may represent a non-transitory computer readable medium. FIG. 11 may represent an example method for active directory management and remediation, and the steps of the method. FIG. 12 may represent a non-transitory computer readable medium 1202 having stored thereon machine readable instructions to provide active directory management and remediation according to an example. The machine readable instructions, when executed, cause a processor 1204 to perform the instructions of the block diagram 1200 also shown in FIG. 12.

The processor 1002 of FIG. 10 and/or the processor 1204 of FIG. 12 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1202 of FIG. 12), such as hardware storage devices (e.g., RAM (random access memory), ROM (read only memory), EPROM (erasable, programmable ROM), EEPROM (electrically erasable, programmable ROM), hard drives, and flash memory). The memory 1004 may include a RAM, where the machine readable instructions and data for a processor may reside during runtime.

Referring to FIGS. 1-10, and particularly to the block diagram 1000 shown in FIG. 10, the memory 1004 may include instructions 1006 to obtain data 104 associated with active directories 106.

The processor 1002 may fetch, decode, and execute the instructions 1008 to generate, based on the obtained data 104, a data model 108 that includes a plurality of active directory concepts 110.

The processor 1002 may fetch, decode, and execute the instructions 1010 to generate a graph 114 that includes the active directory concepts 110 as nodes and relationships between the nodes.

The processor 1002 may fetch, decode, and execute the instructions 1012 to analyze the graph 114 to identify user to group memberships.

The processor 1002 may fetch, decode, and execute the instructions 1014 to determine, for each identified user to group membership of the user to group memberships, a membership score 118.

The processor 1002 may fetch, decode, and execute the instructions 1016 to determine, for each identified user to group membership of the user to group memberships, a reasoning 120 for the membership score 118.

The processor 1002 may fetch, decode, and execute the instructions 1018 to analyze, for each identified user to group membership of the user to group memberships, the membership score 118 and the reasoning 120 for the membership score 118.

The processor 1002 may fetch, decode, and execute the instructions 1020 to remediate, based on the analysis, for each identified user to group membership of the user to group memberships, of the membership score 118 and the reasoning 120 for the membership score 118, at least one of the user to group memberships Referring to FIGS. 1-9 and 11, and particularly FIG. 11, for the method 1100, at block 1102, the method may include generating, based on analysis of data 104 associated with active directories 106, a data model 108 that includes a plurality of active directory concepts 110.

At block 1104, the method may include generating a graph 114 that includes the active directory concepts 110 as nodes and relationships between the nodes.

At block 1106, the method may include analyzing the graph 114 to identify user to group memberships.

At block 1108, the method may include determining, for each identified user to group membership of the user to group memberships, at least one of a membership score 118 or a reasoning 120 for the membership score.

At block 1110, the method may include remediating, based on an analysis, for each identified user to group membership of the user to group memberships, of the at least one of the membership score 118 or the reasoning 120 for the membership score, at least one of the user to group memberships.

Referring to FIGS. 1-9 and 12, and particularly FIG. 12, for the block diagram 1200, the non-transitory computer readable medium 1202 may include instructions 1206 to generate, based on analysis of data 104 associated with active directories 106, a data model 108 that includes a plurality of active directory concepts 110.

The processor 1204 may fetch, decode, and execute the instructions 1208 to generate, based on the active directory concepts 110, a graph 114.

The processor 1204 may fetch, decode, and execute the instructions 1210 to analyze the graph 114 to identify at least one user to group membership.

The processor 1204 may fetch, decode, and execute the instructions 1212 to determine, for the at least one identified user to group membership, a membership score 118.

The processor 1204 may fetch, decode, and execute the instructions 1214 to remediate, based on an analysis, for the at least one identified user to group membership, of the membership score 118, the at least one identified user to group membership.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An active directory management and remediation apparatus comprising:
    a data model generator, executed by at least one hardware processor, to
        obtain data associated with active directories, and
        generate, based on the obtained data, a data model that includes a plurality of active directory concepts;
    a graph generator, executed by the at least one hardware processor, to
        generate a graph that includes the active directory concepts as nodes and relationships between the nodes;
    an membership score generator, executed by the at least one hardware processor, to
        analyze the graph to identify user to group memberships,
        determine, for each identified user to group membership of the user to group memberships, a membership score, and
        determine, for each identified user to group membership of the user to group memberships, a reasoning for the membership score;
    an active directory remediator, executed by the at least one hardware processor, to
        analyze, for each identified user to group membership of the user to group memberships, the membership score and the reasoning for the membership score;
        remediate, based on the analysis, for each identified user to group membership of the user to group memberships, of the membership score and the reasoning for the membership score, at least one of the user to group memberships; and
    an insights generator, executed by the at least one hardware processor, to
        generate, based on a query by a user and an analysis of groups from the user to group memberships for which the user is a member, an insight that includes an indication of at least one application accessible by the user.

2. The active directory management and remediation apparatus according to claim 1, wherein the plurality of active directory concepts includes at least one of:
    active directory accounts and groups;
    ownership information for the active directory accounts and groups;
    membership information for the active directory accounts and groups;
    nesting information for the active directory accounts and groups; or
    access information for the active directory accounts and groups.

3. The active directory management and remediation apparatus according to claim 1, wherein each node of the nodes and each relationship of the relationships includes a type and a property.

4. The active directory management and remediation apparatus according to claim 1, wherein the membership score generator is executed by the at least one hardware processor to determine, for each identified user to group membership of the user to group memberships, the membership score that includes at least one of:
    a numerical score on a specified scale, or
    a classification as a category of a plurality of categories.

5. The active directory management and remediation apparatus according to claim 1, wherein the membership score generator is executed by the at least one hardware processor to determine, for each identified user to group membership of the user to group memberships, the membership score that includes:
    a numerical score including a confidence for direct or indirect user to group memberships.

6. The active directory management and remediation apparatus according to claim 1, further comprising:
    an active directory visualization generator, executed by the at least one hardware processor, to
        generate, based on the identified user to group memberships, at least one display of the identified user to group memberships.

7. The active directory management and remediation apparatus according to claim 6, wherein the active directory visualization generator is executed by the at least one hardware processor to:
    generate, based on the identified of the user to group memberships, the at least one display that includes at least one of:
        a dashboard display that includes active directory group information for the active directories;
        a group overview display that includes color cues based on an average confidence score for a group;
        a user overview display that includes search results based on user names;
        a group details display that includes search results based on group attributes; or
        a user details display that includes a hierarchy of groups a selected group is nested into.

8. The active directory management and remediation apparatus according to claim 1, wherein the active directory remediator is executed by the at least one hardware processor to remediate, based on the analysis, for each identified user to group membership of the user to group memberships, of the membership score and the reasoning for the membership score, the at least one of the user to group memberships by:
    removing the at least one of the user to group memberships.

9. The active directory management and remediation apparatus according to claim 1, wherein the active directory remediator is executed by the at least one hardware processor to remediate, based on the analysis, for each identified user to group membership of the user to group memberships, of the membership score and the reasoning for the membership score, the at least one of the user to group memberships by:
    modifying, without removing, the at least one of the user to group memberships.

10. The active directory management and remediation apparatus according to claim 1, further comprising:

an insights generator, executed by the at least one hardware processor, to
generate, based on a query by a user, an insight that includes
an indication of groups for which the user is a member, and
confidence values associated with the groups for which the user is the member.

11. A method for active directory management and remediation, the method comprising:
generating, by at least one hardware processor, based on analysis of data associated with active directories, a data model that includes a plurality of active directory concepts;
generating, by the at least one hardware processor, a graph that includes the active directory concepts as nodes and relationships between the nodes;
analyzing, by the at least one hardware processor, the graph to identify user to group memberships;
determining, by the at least one hardware processor, for each identified user to group membership of the user to group memberships, at least one of a membership score or a reasoning for the membership score;
remediating, by the at least one hardware processor, based on an analysis, for each identified user to group membership of the user to group memberships, of the at least one of the membership score or the reasoning for the membership score, at least one of the user to group memberships; and
generating, by the at least one hardware processor, based on a query by a user and an analysis of groups from the user to group memberships for which the user is the member, an insight that includes an indication of at least one application accessible by the user.

12. The method for active directory management and remediation according to claim 11, the method comprising:
generating, by the at least one hardware processor, based on the identified user to group memberships, at least one display of the identified user to group memberships.

13. The method for active directory management and remediation according to claim 11, wherein remediating, by the at least one hardware processor, based on the analysis, for each identified user to group membership of the user to group memberships, of the at least one of the membership score or the reasoning for the membership score, the at least one of the user to group memberships further comprises:
removing, by the at least one hardware processor, the at least one of the user to group memberships.

14. The method for active directory management and remediation according to claim 11, wherein remediating, by the at least one hardware processor, based on the analysis, for each identified user to group membership of the user to group memberships, of the at least one of the membership score or the reasoning for the membership score, the at least one of the user to group memberships further comprises:
modifying, by the at least one hardware processor, without removing, the at least one of the user to group memberships.

15. The method for active directory management and remediation according to claim 11, further comprising:
generating, by the at least one hardware processor, based on the query by the user, the insight that includes
another indication of the groups for which the user is the member, and confidence values associated with the groups for which the user is the member.

16. A non-transitory computer readable medium having stored thereon machine readable instructions, the machine readable instructions, when executed by at least one hardware processor, cause the at least one hardware processor to:
generate, based on analysis of data associated with active directories, a data model that includes a plurality of active directory concepts;
generate, based on the active directory concepts, a graph;
analyze the graph to identify at least one user to group membership;
determine, for the at least one identified user to group membership, a membership score;
remediate, based on an analysis, for the at least one identified user to group membership, of the membership score, the at least one identified user to group membership; and
generate, based on a query by a user and an analysis of groups from user to group memberships including the at least one identified user to group membership for which the user is a member, an insight that includes an indication of confidence values associated with the groups for which the user is the member.

17. The non-transitory computer readable medium according to claim 16, wherein the machine readable instructions to remediate, based on the analysis, for the at least one identified user to group membership, of the membership score, the at least one identified user to group membership, when executed by the at least one hardware processor, further cause the at least one hardware processor to:
remove the at least one identified user to group membership.

18. The non-transitory computer readable medium according to claim 16, wherein the machine readable instructions to remediate, based on the analysis, for the at least one identified user to group membership, of the membership score, the at least one identified user to group membership, when executed by the at least one hardware processor, further cause the at least one hardware processor to:
modify, without removing, the at least one identified user to group membership.

19. The non-transitory computer readable medium according to claim 16, wherein the machine readable instructions, when executed by the at least one hardware processor, further cause the at least one hardware processor to:
generate, based on the query by the user, the insight that includes,
or
another indication of at least one application accessible by the user based on the groups for which the user is the member.

* * * * *